(12) United States Patent
Deardurff et al.

(10) Patent No.: US 7,399,174 B2
(45) Date of Patent: Jul. 15, 2008

(54) METHOD AND APPARATUS FOR COMPRESSION MOLDING PLASTIC ARTICLES

(75) Inventors: L. Robert Deardurff, Waterville, OH (US); Richard A. Farquharson, Rossford, OH (US); George Knapik, Sylvania, OH (US); Thomas E. Nahill, Amhurst, NH (US); Gregory A. Ritz, Berkey, OH (US); Michael A. Rymer, Holland, OH (US); John B. Wright, Port McNicoll (CA)

(73) Assignee: Graham Packaging PET Technologies Inc., York, PA (US)

( * ) Notice: Subject to any disclaimer, the term of this patent is extended or adjusted under 35 U.S.C. 154(b) by 573 days.

(21) Appl. No.: 10/822,299

(22) Filed: Apr. 8, 2004

(65) Prior Publication Data

US 2005/0225008 A1 Oct. 13, 2005

(51) Int. Cl.
    *B29C 43/02* (2006.01)
(52) U.S. Cl. .............. 425/348 R; 425/451; 425/451.3; 425/809
(58) Field of Classification Search ............ 425/297, 425/313, 348 R, 451, 451.3, 809, DIG. 5
    See application file for complete search history.

(56) References Cited

U.S. PATENT DOCUMENTS

| | | | |
|---|---|---|---|
| 3,743,469 A | 7/1973 | Gibbons | |
| 4,018,860 A | 4/1977 | Farrell | |
| 4,019,849 A | 4/1977 | Farrell | |
| 4,059,383 A | 11/1977 | Tsutsumi | |
| 4,133,625 A | 1/1979 | Kellermann et al. | |
| 4,151,243 A | 4/1979 | Allen | |
| 4,212,605 A | 7/1980 | MacMillan | |
| 4,330,257 A | 5/1982 | Rees et al. | |
| 4,372,738 A | 2/1983 | Black et al. | |
| 4,403,810 A | 9/1983 | Bieneck | |
| 4,515,544 A | 5/1985 | Boehm et al. | |
| 4,529,372 A | 7/1985 | Saumsiegle | |
| 4,640,673 A | 2/1987 | Takeda et al. | |
| 4,650,412 A | 3/1987 | Windstrup et al. | |
| 4,660,801 A | 4/1987 | Schad | |
| 4,693,679 A | 9/1987 | Marth | |
| 4,737,093 A | 4/1988 | Hori et al. | |
| 4,755,125 A | 7/1988 | Takeda et al. | |
| 4,759,708 A | 7/1988 | Hestehave et al. | |

(Continued)

FOREIGN PATENT DOCUMENTS

EP 000158031 A1 10/1985

(Continued)

*Primary Examiner*—Yogendra Gupta
*Assistant Examiner*—Thu Khanh T Nguyen
(74) *Attorney, Agent, or Firm*—Rissman Jobse Hendricks & Oliverio LLP

(57) ABSTRACT

A method and apparatus for compression molding plastic articles include a plurality of tools mounted in opposed pairs with the tools of each pair including opposed first and second actuators that define a mold cavity in which a charge of plastic is compression molded. The tooling is preferably carried by a rotary turret so that first and second actuators of each tooling pair are moveable relative to each other between an open position permitting formed articles to be removed from the tooling and to receive fresh charges of plastic, and a closed position to compression mold the charges of plastic.

14 Claims, 24 Drawing Sheets

U.S. PATENT DOCUMENTS

| | | | |
|---|---|---|---|
| 4,824,351 | A | 4/1989 | Ramsey |
| 4,834,642 | A | 5/1989 | Voss et al. |
| 4,871,507 | A | 10/1989 | Ajmera |
| 4,986,944 | A | 1/1991 | Bertschi |
| 5,035,594 | A | 7/1991 | Murayama et al. |
| 5,064,366 | A | 11/1991 | Voss |
| 5,071,339 | A | 12/1991 | Murayama et al. |
| 5,114,335 | A | 5/1992 | Tinsley |
| 5,118,273 | A | 6/1992 | Murayama |
| 5,225,132 | A | 7/1993 | Farina |
| 5,371,518 | A | 12/1994 | Sasaki et al. |
| 5,407,344 | A | 4/1995 | Rombalski, Jr. et al. |
| 5,433,916 | A | 7/1995 | Budzynski et al. |
| 5,478,512 | A | 12/1995 | Miller et al. |
| 5,498,150 | A | 3/1996 | Check |
| 5,529,483 | A | 6/1996 | Abe et al. |
| 5,554,327 | A | 9/1996 | Ingram et al. |
| 5,556,648 | A | 9/1996 | Budzynski et al. |
| 5,603,964 | A | 2/1997 | Rote et al. |
| 5,662,856 | A | 9/1997 | Wunderlich |
| 5,670,100 | A | 9/1997 | Ingram |
| 5,770,130 | A | 6/1998 | Ingram et al. |
| 5,866,177 | A | 2/1999 | Ingram |
| 5,922,372 | A | 7/1999 | Schad |
| 5,932,155 | A | 8/1999 | Ingram |
| 5,935,621 | A | 8/1999 | Gellert et al. |
| 5,950,531 | A * | 9/1999 | Uchiyama .................. 100/353 |
| 5,989,007 | A | 11/1999 | Ingram et al. |
| 6,042,754 | A | 3/2000 | Yang et al. |
| 6,074,583 | A | 6/2000 | Ingram |
| 6,077,067 | A | 6/2000 | Gellert |
| 6,079,972 | A | 6/2000 | Gellert |
| 6,085,552 | A | 7/2000 | Voisine et al. |
| 6,123,880 | A | 9/2000 | Ingram |
| 6,171,541 | B1 | 1/2001 | Neter et al. |
| 6,179,606 | B1 | 1/2001 | Muller |
| 6,217,818 | B1 | 4/2001 | Collette et al. |
| 6,248,281 | B1 | 6/2001 | Abe et al. |
| 6,276,922 | B1 | 8/2001 | Huston et al. |
| 6,299,428 | B1 | 10/2001 | Ingram |
| 6,332,770 | B1 | 12/2001 | Oueslati et al. |
| 6,349,838 | B1 | 2/2002 | Saito et al. |
| 6,368,094 | B1 | 4/2002 | Dennis et al. |
| 6,416,312 | B1 | 7/2002 | Gonser et al. |
| 6,422,854 | B1 | 7/2002 | Dennis et al. |
| 6,425,752 | B1 | 7/2002 | Check |
| RE37,827 | E | 9/2002 | Schad |
| 6,461,556 | B1 | 10/2002 | Neter |
| 6,478,568 | B2 | 11/2002 | Ingram |
| 6,485,669 | B1 | 11/2002 | Boyd et al. |
| 6,485,670 | B1 | 11/2002 | Boyd et al. |
| 6,514,451 | B1 | 2/2003 | Boyd et al. |
| 6,524,091 | B2 | 2/2003 | Romi |
| 6,558,145 | B2 | 5/2003 | Wieder |
| 6,558,598 | B2 | 5/2003 | Neter et al. |
| 6,572,356 | B2 * | 6/2003 | Seger .......................... 425/195 |
| 6,572,812 | B2 | 6/2003 | Collette et al. |
| 6,602,065 | B1 | 8/2003 | Ingram |
| 6,613,262 | B1 | 9/2003 | Arend |
| RE38,265 | E | 10/2003 | Gellert et al. |
| 2001/0005063 | A1 | 6/2001 | Neter |
| 2001/0051194 | A1 | 12/2001 | Yoda et al. |
| 2002/0025356 | A1 | 2/2002 | Ingram |
| 2002/0028265 | A1 | 3/2002 | Oueslati et al. |
| 2002/0053760 | A1 | 5/2002 | Boyd et al. |
| 2002/0076462 | A1 | 6/2002 | Boyd et al. |
| 2002/0098310 | A1 | 7/2002 | Kikuchi et al. |
| 2002/0106420 | A1 | 8/2002 | Vandenberg |
| 2002/0160076 | A1 | 10/2002 | Kubota et al. |
| 2002/0187217 | A1 | 12/2002 | McDonald et al. |
| 2003/0064128 | A1 | 4/2003 | Byrnes |
| 2003/0180410 | A1 | 9/2003 | Priest |
| 2003/0190385 | A1 | 10/2003 | Niese |

FOREIGN PATENT DOCUMENTS

| | | |
|---|---|---|
| EP | 000265750 A2 | 5/1988 |
| EP | 0 280 190 A2 | 8/1988 |
| EP | 0 362 395 | 4/1990 |
| EP | 0 529 938 A2 | 3/1993 |
| EP | 1 273 417 A2 | 1/2003 |
| FR | 1 324 471 A | 4/1963 |
| JP | 358173612 A | 10/1982 |
| JP | 360245517 A | 12/1985 |
| JP | 401241419 A | 9/1989 |
| JP | 401262108 A | 10/1989 |
| JP | 405345339 A | 12/1993 |
| JP | 405345340 A | 12/1993 |

* cited by examiner

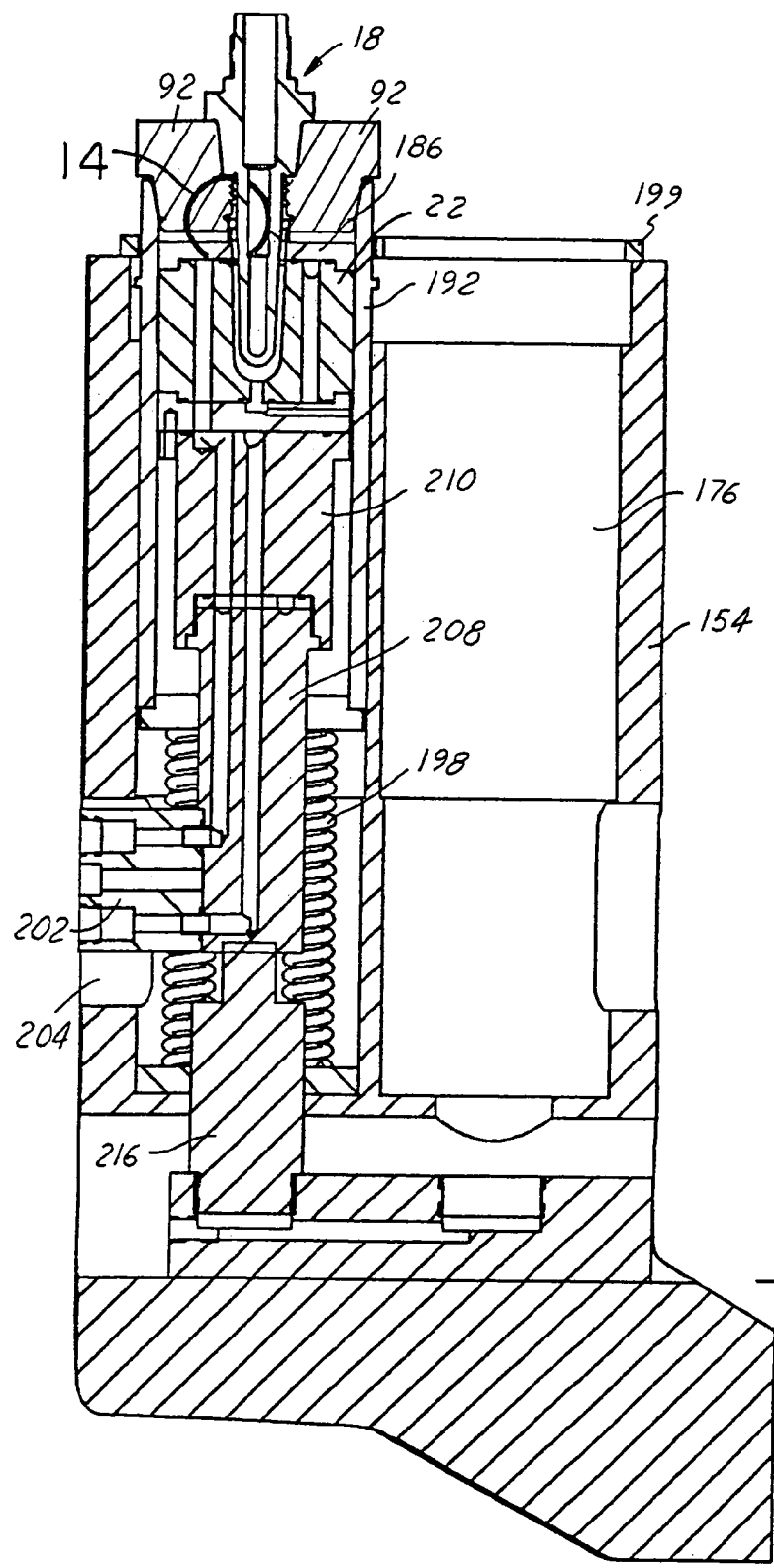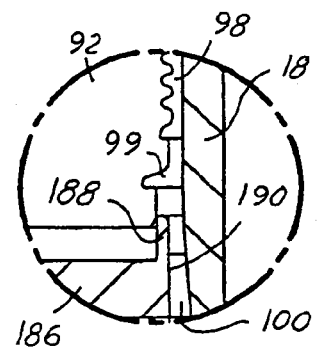
FIG. 14
FIG. 13

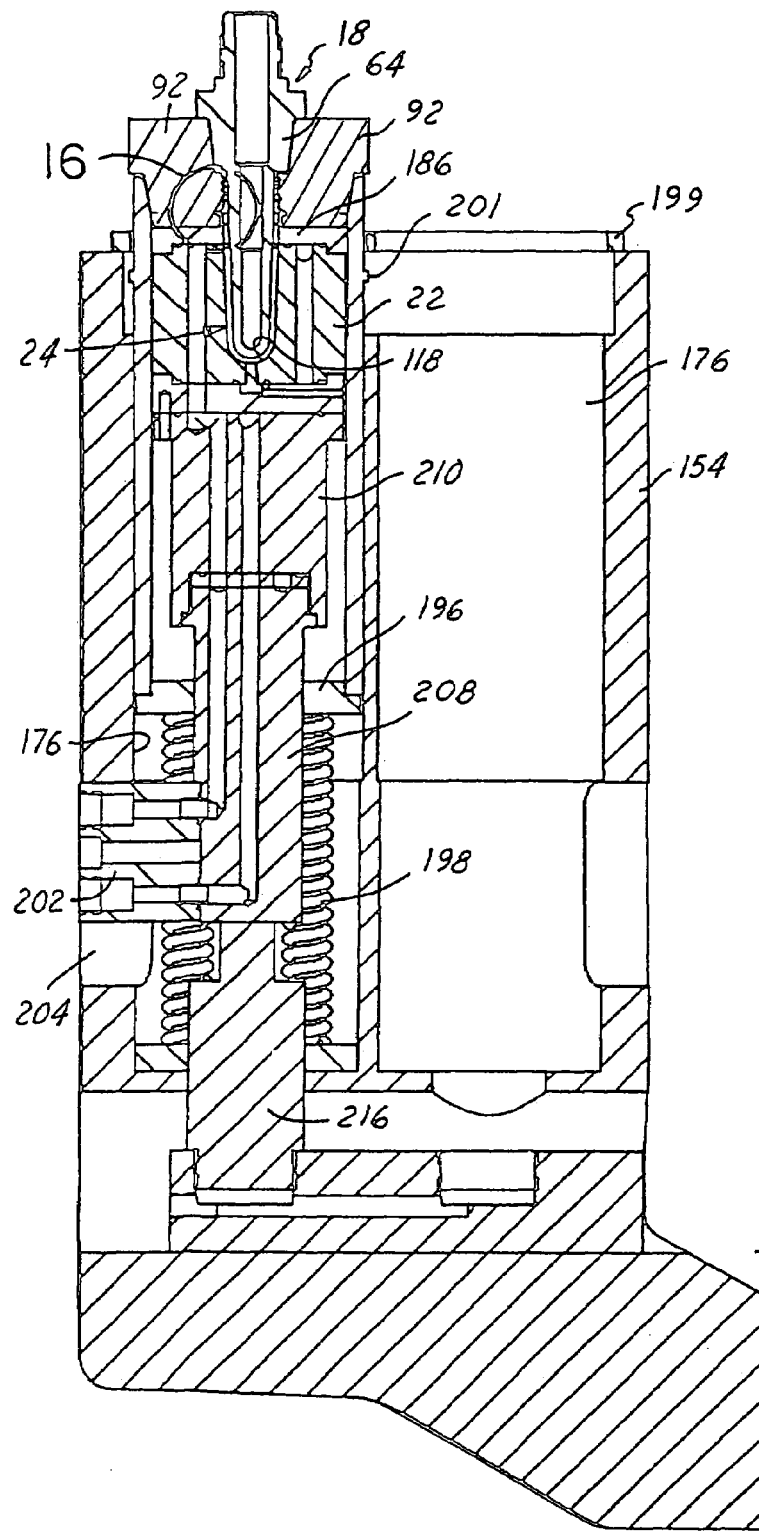
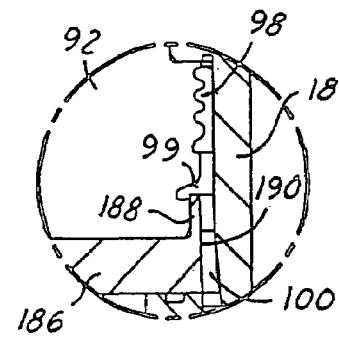
FIG. 15
FIG. 16

METHOD AND APPARATUS FOR COMPRESSION MOLDING PLASTIC ARTICLES

FIELD OF THE INVENTION

This invention relates to a method and apparatus for compression molding plastic articles, such as plastic preforms that are subsequently molded into plastic containers.

BACKGROUND OF THE INVENTION

Various plastic articles, such as plastic closures for containers, have been formed by a compression molding process. Some compression molding machines have a plurality of tools mounted in a circumferential array on a rotatable turret in a plurality of opposed coacting pairs. The tools of each pair carry opposed male and female mold sections that when closed together form a cavity mold for compression molding the desired articles. The turret rotates adjacent a machine frame that carries cams for moving the tools of each pair toward each other during a portion of each revolution of the turret for compression molding articles between the tool pairs, and away from each other during another portion of the each turret revolution for releasing articles molded between the tools and to receive fresh charges of plastic into the mold cavities.

So that the opposed pairs of tooling can move relative to each other and the turret, the tooling is typically mounted on elongate rods by bushings and bearings to permit slidable movement of each half of a tooling pair relative to the other half of the pair. A defined clearance is required between each rod and its associated bushings and bearings to permit relative sliding movement of the mold tooling relative to the rod without undue friction and typically, to receive a lubricant to facilitate that relative movement. The required clearance reduces accuracy in the alignment of the opposed halves of the tooling pair and can increase wear of the bushings bearings, rod and other tooling components, and the need to maintain lubrication increases the maintenance burden for the apparatus.

After the opposed halves of the tooling pair are mated together to form a charge of plastic into its desired shape. It is desirable to lock the mated halves of the tooling pair together so that the desired compression molding force is maintained between the halves of the mated tooling pair without having to continually apply an external force to maintain the tooling halves together. However, the plastic being molded will shrink as it cools and cures, and it is desirable to reduce the size of the mold cavity in proportion to the shrinkage encountered during cooling of the plastic to maintain a desired pressure within the mold cavity and acting on the plastic material throughout the compression molding process. In view of the relatively high pressure and force utilized during the compression molding process, it is also desirable to provide a mechanism or assembly to protect the tooling and compression molding machine in general should a failure occur, such as may happen if a previously formed part is not adequately removed from the mold tooling, or if an overly large plastic charge is delivered into a mold cavity, for example.

SUMMARY OF THE INVENTION

The present invention embodies a number of different aspects, which can be implemented separately from or, more preferably in combination with each other.

A method and apparatus for compression molding plastic articles include a plurality of tools mounted in opposed pairs with the tools of each pair including opposed first and second actuators that define a mold cavity in which a charge of plastic is compression molded. The tooling is preferably carried by a rotary turret so that first and second actuators of each tooling pair are moveable relative to each other between an open position permitting formed articles to be removed from the tooling and to receive fresh charges of plastic, and a closed position to compression mold the charges of plastic.

In one presently preferred aspect of the invention, the apparatus includes linear bearings upon which the first and second actuators of each tooling pair reciprocate relative to each other between open and closed positions. The linear bearings preferably comprise rails connected to a base, such as a turret, and one or more blocks slidably engaging the rails and carried by the actuators. The blocks preferably include preloaded and recirculating balls in such a manner that at least a plurality of balls are constantly engaged with the rails eliminating any clearance or gap between the blocks and rails as the tooling reciprocates relative to the turret.

Also, in accordance with another presently preferred aspect of the invention, each tooling pair of the apparatus includes a lock assembly that is operable to hold the first and second actuators together in their closed position when desired. Desirably, the lock assembly includes a locking rod carried by either the first or second actuator and a slide bar carried by the actuator that does not carry the locking rod. In one presently preferred implementation, the locking rod extends along a center line of the reactive forces tending to separate the closed halves of the tooling pair and is received in a complementary bore in the opposing actuator of the tooling pair when the actuators are in their closed position. The slide bar is selectively engaged with the locking rod to prevent withdrawal of the locking rod from the adjacent actuator and thereby maintain the first and second actuators together in their closed position. Desirably, the slide bar can be moved into and out of engagement with the locking rod by suitable cam mechanisms. Accordingly, rotation of the turret can selectively engage a follower associated with the slide bar with appropriate cam surfaces to move the lock slide into and out of engagement with the locking rod. Desirably, each tooling pair defines a plurality of mold cavities to simultaneously compression mold a plurality of plastic articles, and a single lock assembly can be used to maintain the actuators of each tooling pair together.

Also, in accordance with a further presently preferred aspect of the invention, each tooling pair includes at least one fluid cylinder adapted to absorb over-travel of a mold section to prevent damage to the tooling such as during a crash or other maulfunction during the molding cycle. For example, if a previously compression molded article is not removed from a mold cavity, the volume taken up by that formed plastic article will interfere with the formation of a subsequent charge of plastic introduced into the cavity resulting in increased forces within the mold cavity that can damage the tooling and/or the compression molding apparatus generally. Each tooling pair preferably includes a shear plate associated with a mold section carried by one of the actuators to protect the tooling. The shear plate is designed to break and release the mold section if unusually high forces are applied to the mold section to prevent damage to the mold section and actuators, as well as the machine frame and cams of the apparatus.

Also desirably, in accordance with another aspect of the invention, a cylindrical sleeve is slidably carried by one of the actuators and is adapted to engage, receive and guide a portion of a mold section to positively align the mold section with the mold tooling of the other actuator. In one preferred implementation, the cylindrical sleeve includes a circumferentially continuous tapered alignment surface adapted to be engaged by a mating tapered surface on the opposed mold section to locate and align the opposed mold section relative to the mold cavity. The cylindrical sleeve is preferably yieldably biased, such as by one or more springs, to an extended position to facilitate engagement with the opposed mold section and can be slidably axially retracted against the biasing force if engaged by the opposed mold section to prevent damage to the mold tooling.

BRIEF DESCRIPTION OF THE DRAWINGS

These and other objects, features, advantages and aspects of the presently preferred method and apparatus for compression molding plastic articles will be apparent from the following detailed description of the preferred embodiments and best mode, appended claims and accompanying drawings in which:

FIG. 13 is a cross-sectional view like FIG. 12 illustrating continued movement of the male mold section relative to the second actuator;

FIG. 14 is an enlarged fragmentary sectional view of the encircled portion 14 in FIG. 13;

FIG. 15 is a cross-sectional view of the second actuator like FIG. 13 illustrating further movement of the male mold section relative to the second actuator;

FIG. 16 is an enlarged fragmentary sectional view of the encircled portion 16 in FIG. 15;

DETAILED DESCRIPTION OF THE PREFERRED EMBODIMENTS

Figure 1A:
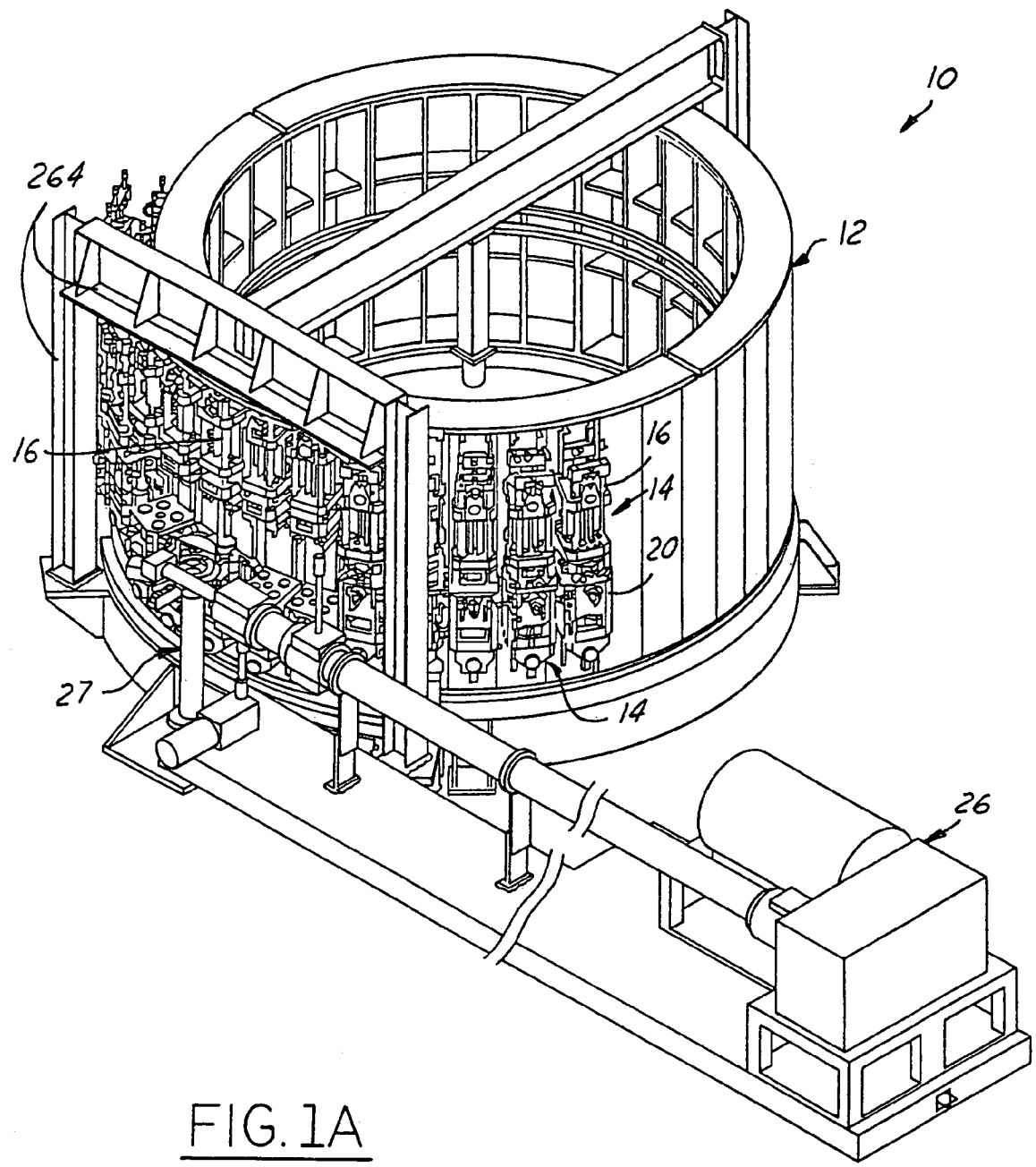
FIG. 1A is a perspective view of one presently preferred embodiment of an apparatus for compression molding plastic articles.
Figure 1B:
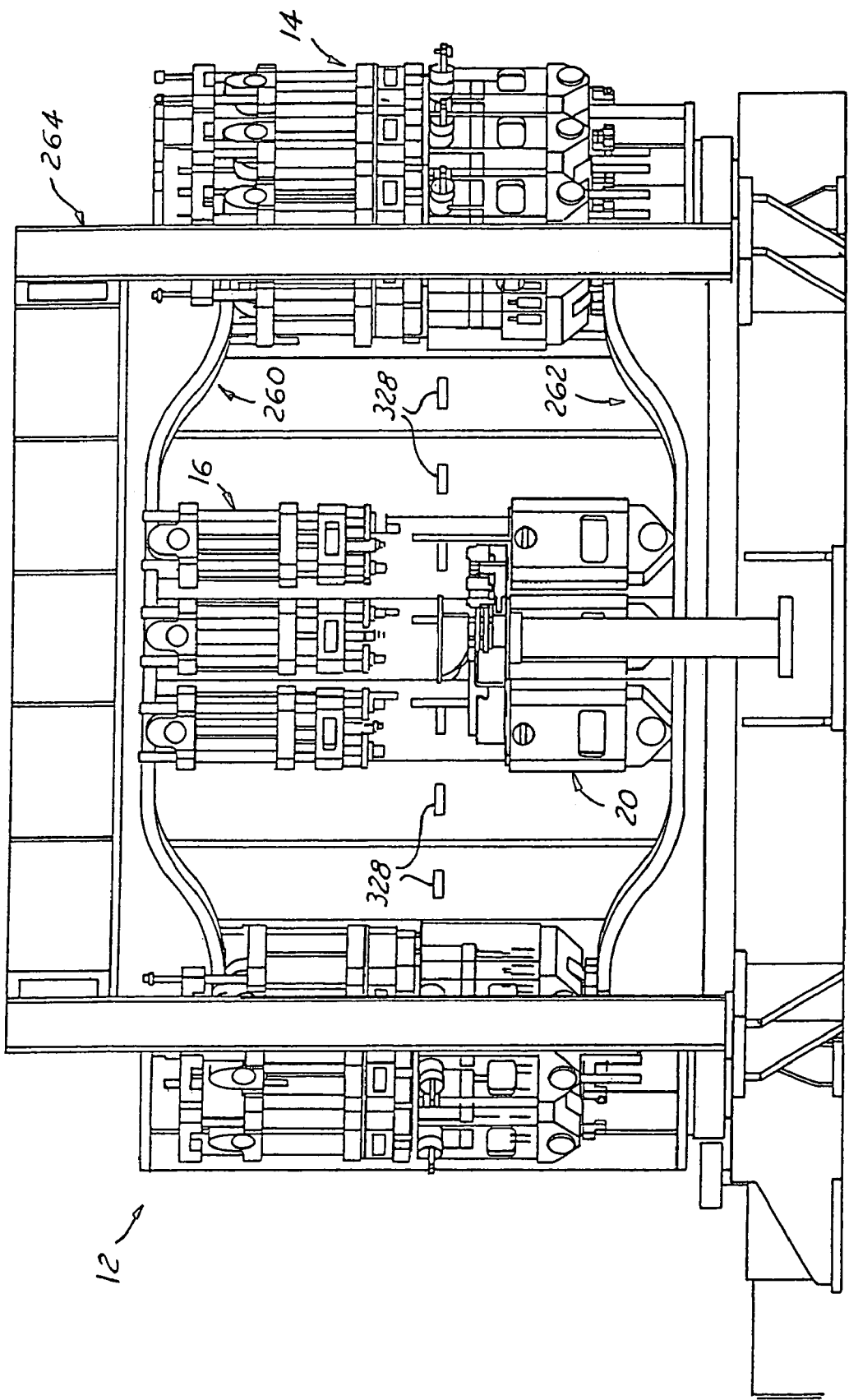
FIG. 1B is a side view of the apparatus of FIG. 1A.

Referring in more detail to the drawings, FIG. 1 illustrates an apparatus 10 for compression molding plastic articles, such as preforms used in forming plastic containers. The apparatus 10 includes a rotatable base or turret 12 on which a plurality of tooling pairs 14 are mounted in an endless path for rotation with the turret 12 enabling a continuous compression molding process. Each tooling pair 14 includes a first actuator 16 with a male mold section 18 and a second actuator 20 with a female mold section 22 that with the male mold section 18 defines a mold cavity 24 in which a plastic article is compression molded. Preferably, the apparatus 10 is constructed and arranged so that a plastic article is formed in each mold cavity 24 for each revolution of the turret 12. An extruder 26 provides molten plastic charges that are delivered to each of the mold cavities by a distributor 27 during a portion of each revolution of the turret 12 wherein the first and second actuators 16, 20 are separated or opened.

Figures 2, 3:
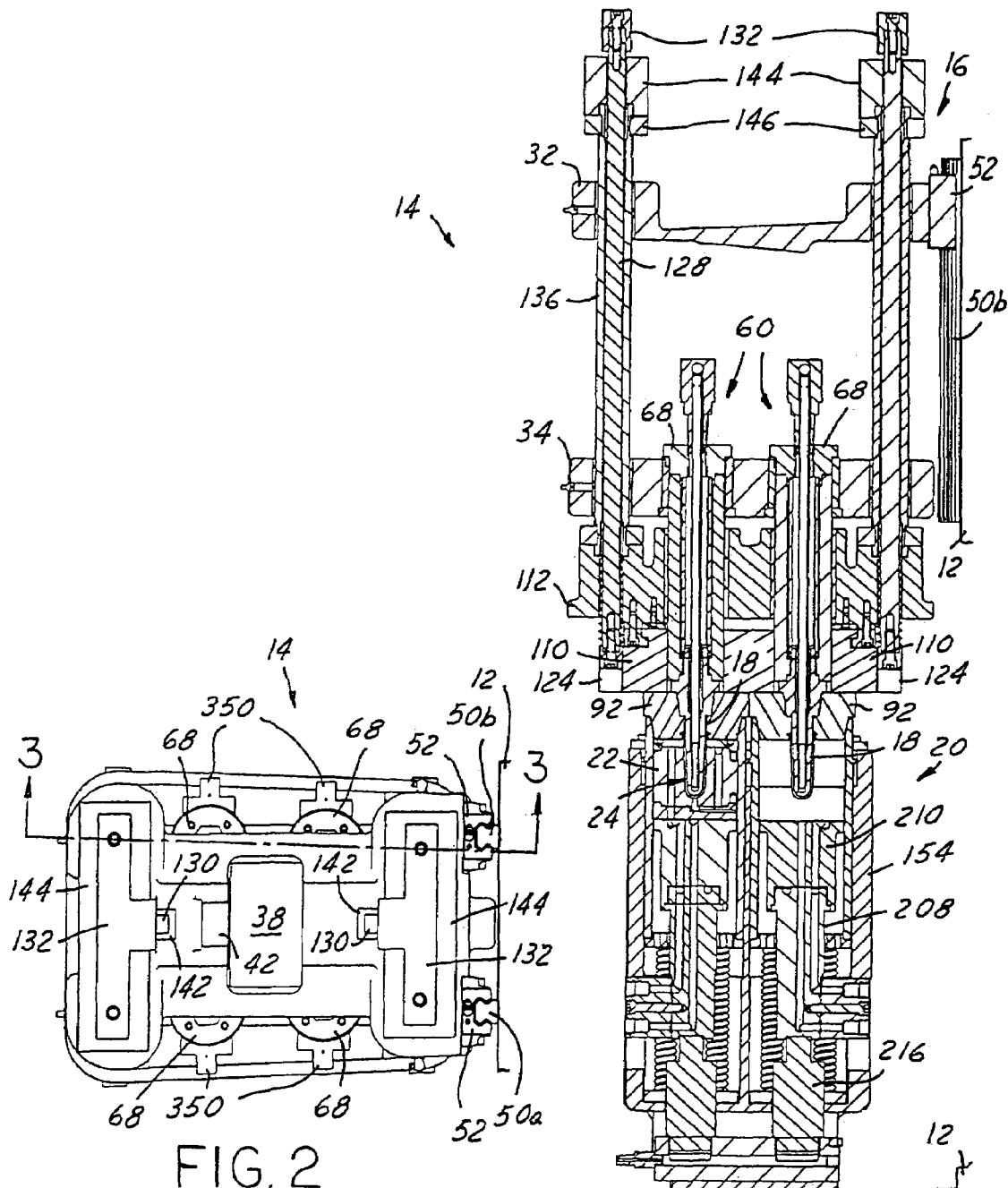
FIG. 2 is a plan view of one tooling pair utilized in the compression molding apparatus of FIG. 1.
FIG. 3 is a cross-sectional view of the tooling pair taken along line 3-3 in FIG. 2.

As shown in FIGS. 2 and 3, each tooling pair 14 includes an upper or first actuator 16 and a lower or second actuator 20. Each first actuator 16 carries at least one, and preferably a plurality of male mold sections 18 that are axially aligned with and linearly reciprocated relative to separate corresponding female mold sections 22 carried by the lower actuator 20. The first and second actuators 16, 20 are moved relative to each other between a closed position wherein plastic charges in each mold cavity 24 are molded, and an open position permitting molded articles to be removed from and fresh plastic charges to be added to each mold cavity 24.

The upper actuator 16 of each tooling pair includes a main body 30 which may be formed of steel and for reduced weight may include an upper plate 32 rigidly connected to a lower plate 34 by one or more support walls 36. A first upper follower 38 is rotatably carried by the upper plate 32 and in operation of the compression molding apparatus 10 is responsive to the profile or contour of a cam 40 to move the entire first actuator 16 toward the second actuator 20. A second upper follower 42 is carried by a bracket 44 extending from the upper plate 32 and is axially spaced from the first upper follower 38. The second upper follower 42 is responsive to the contour of a cam 46 disposed axially beneath it to lift the first actuator 16 away from the second actuator and to maintain the first actuator away from the second actuator 20.

The movement of the first actuator 16 is controlled by an upper cam assembly including at least the first and second upper followers 38, 42 and their corresponding cams, 40, 46, and is guided by one or more linear bearings 48 disposed between the turret 12 and the first actuator 16. Each linear bearing 48 includes a rail 50 preferably fixed to the turret 12 and at least one block 52 preferably fixed to the first actuator 16 with each block 52 slidably received for linear reciprocation along the rail 50 to permit linear reciprocation of the entire first actuator 16 relative to the turret. Desirably, two circumferentially spaced rails 50*a*, 50*b* are provided on the turret 12, each rail 50*a*, 50*b* preferably includes two opposed sides 54, 56 each having a groove or track formed therein. Each block 52 preferably contains a plurality of preloaded and recirculating balls 58 arranged to provide a tight fit without any clearance between the block 52 and rails 50*a*, 50*b* to improve control over the reciprocation of the first actuator 16 and to facilitate and maintain proper alignment of the first actuator 16 with the second actuator 20. The balls 58 are preferably arranged in each block 52 so that a plurality of balls are in contact with a track or side of the rail 50*a*, 50*b* at all times, and preferably so that a plurality of balls 58 contact each of the pair of opposed sides 54, 56 of each rail 50*a*, 50*b* at all times to eliminate any play between the blocks 52 and rails 50*a*, 50*b*.

Desirably, two rails 50*a*, 50*b* are mounted on the turret for the first actuator, with each rail 50*a*, 50*b* extending parallel to the axis of rotation of the turret 12. In one preferred embodiment, three blocks 52 are carried by the main body 30 of the first actuator 16 with two blocks 52 on the rail 50*a* that leads the other rail 50*b* with respect to the direction of rotation of the turret 12, and one block 52 on the other rail 50*b*. The two blocks 52 on the leading rail 50*a* are preferably axially spaced and carried one by the upper plate 32 and one by the lower plate 34 of the main body 30. The single block 52 associated with the other rail 50*b* can be carried by either the upper plate 32 or lower plate 34 as desired to guide movement of the first actuator 16 and to support the first actuator 16 against displacement due to lateral forces acting thereon. Desirably, the rails 50*a*, 50*b* associated with the first actuator 16 are circumferentially spaced apart along the turret 12 to increase the stability of the connection between the first actuator 16 and the turret 12, and to better resist movement or displacement of the first actuator 16 due to non-axial loading. Non-axial loading on the linear bearings 48 occurs, for example, when the upper followers 38, 42, which are radially offset from the linear bearings 48, engage a cam surface to drive the first actuator 16. Desirably, the rail 50*b* having only a single block 52 associated therewith can be shorter than the other rail 50*a* since that rail 50*b* only needs to extend the length of the stroke of the single block 52.

The first actuator 16 of each tooling pair 14 carries at least one, and preferably a plurality of male mold sections 18. The male mold sections are preferably equally circumferentially spaced, and radially aligned with the axis of the turret 12. In the embodiment shown, four male mold sections 18 are carried by each first actuator 16 so that four plastic articles can be simultaneously molded by each tooling pair 14. Each male mold section 18 includes a core assembly 60 that is carried by the main body 30 and constructed and arranged to deliver and remove coolant from a mold core 18 to control the temperature of the mold core 18 in use.

As best shown in FIGS. 5, 7, 27 and 27A, each mold core assembly 60 includes a mold core 18 that preferably has an annular collar portion 64 that is threaded into one end of an annular outer sleeve 66 so that the core 18 closes one end of the outer sleeve 66. The other end of the outer sleeve 66 is closed by a cap plate 68 having a through bore 70 which receives an inner tube 72 concentrically aligned with the outer sleeve 66. The inner tube 72 extends through the cap plate 68 and the collar 64, and is preferably at least partially received in the mold core 18, preferably in a short conduit 73 carried in the mold core 18. A fluid fitting 74 is carried at one end of the inner tube 72 and has an inlet 76 communicated with a coolant supply to deliver coolant to the mold core 18 through the inner tube 72. An annular inner sleeve 78 is disposed around the inner tube 72 and within the outer sleeve 66 and is received axially between the cap 68 and the mold core 18. The outer diameter of the inner sleeve 78 is preferably smaller than the inner diameter of the outer sleeve 66 providing an air gap 82 between them that helps insulate the outer sleeve 66 from the inner sleeve 78.

A gap 84 likewise preferably exists between the inner tube 72 and the mold core 18. The gap 84 defines part of a coolant return passage that includes an annular chamber 86 defined between the inner sleeve 78 and inner tube 72, and an outlet 88 in the fluid fitting 74 through which coolant leaves the mold core assembly. Accordingly, coolant enters the mold core assembly through the fitting 74, travels through the inner tube 72 to the interior of the mold core 18, and is returned via the gap 84 defined between the outer surface of the inner tube 72 and the inner surface of the mold core 18, the annular chamber 86 between the inner sleeve 78 and the inner tube 72 and the outlet 88 of the coolant fitting 74. To prevent coolant from entering the air gap 82, a seal 90 is preferably provided between the collar 64 and the inner sleeve 78 and the other end of the inner sleeve 78 is preferably sealed against the cap 68. A separate seal may be provided between the inner sleeve 78 and the cap 68, or the inner sleeve 78 may be closely and sealingly received in an annular grove 91 in the cap 68 providing a fluid tight seal or connection between them.

Figure 17:
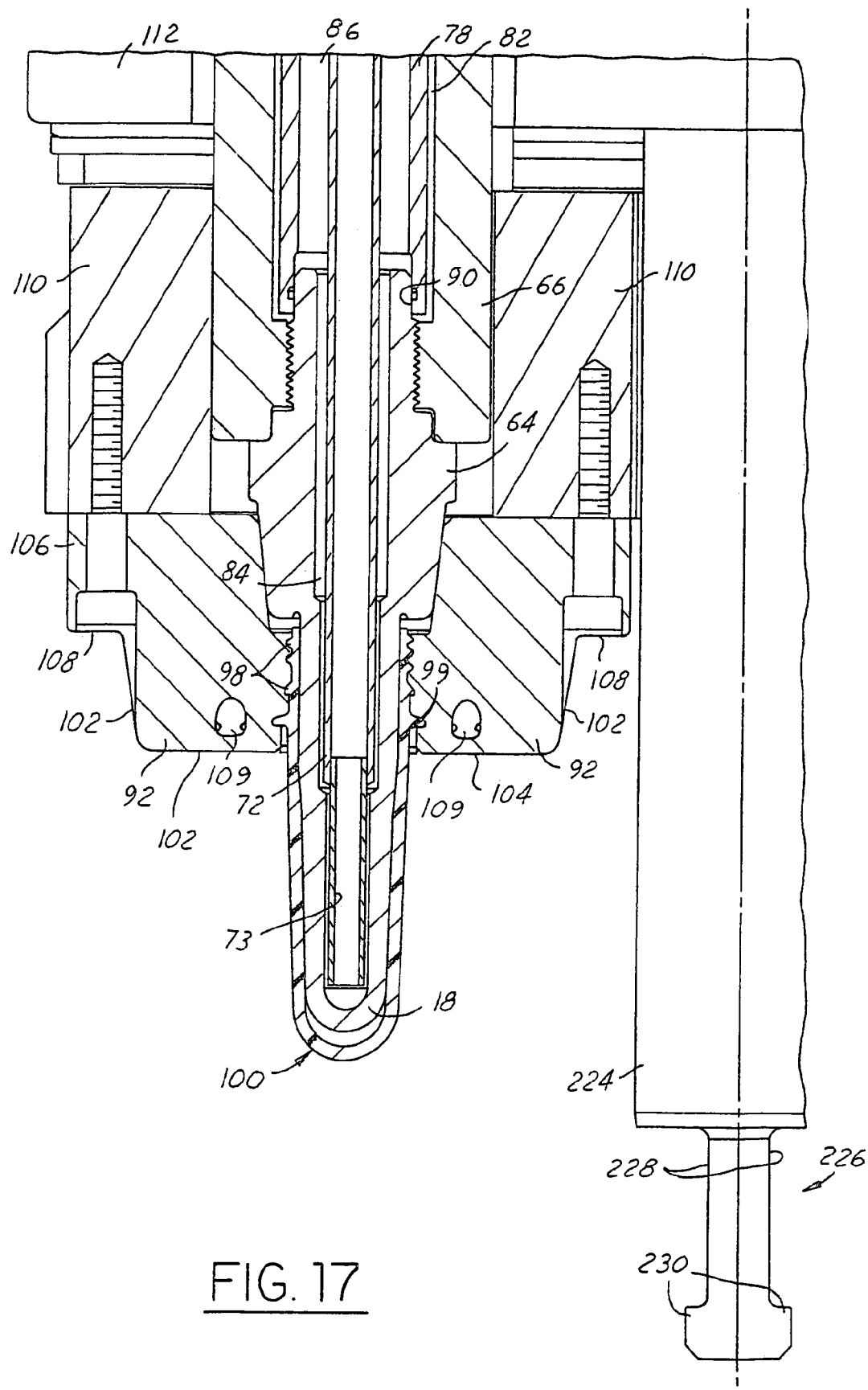
FIG. 17 is a fragmentary cross-sectional view of one male mold section of a first actuator with a molded preform thereon.

Each male mold section 18 also includes at least two neck ring sections or thread splits 92 that are disposed around a portion of each mold core 18 and preferably enclose at least a portion of the collar 64. The thread splits 92 define an annular chamber 94 surrounding the adjacent portion of the mold core 18 and include circumferentially extending grooves 96 that when filled with plastic define exterior threads 98 and a radially outwardly extending flange 99 on a molded plastic article 100. The chamber 94 defines a part of the mold cavity 24 in which a plastic article 100 is formed so the thread splits 92 act as female mold sections that with the core 18 and female mold section 22, define at least part of the mold cavity 24 in which plastic articles are formed. The thread splits 92 preferably include a circumferentially and axially extending tapered surface 102 (FIG. 17) extending radially outward from a planar leading surface 104 to a base 106 that extends radially outwardly from the tapered surface 102 defining a planar annular shoulder 108 between them. The thread splits 92 are formed in two or more pieces so that they may move laterally or radially relative to an axis of the mold core 18 to facilitate removing a formed plastic article 100 from the mold core 18. To facilitate cooling the thread splits, one or more coolant passages 109 (FIGS. 17-21) may be provided in the thread splits and through which a coolant may be passed.

Figure 4:
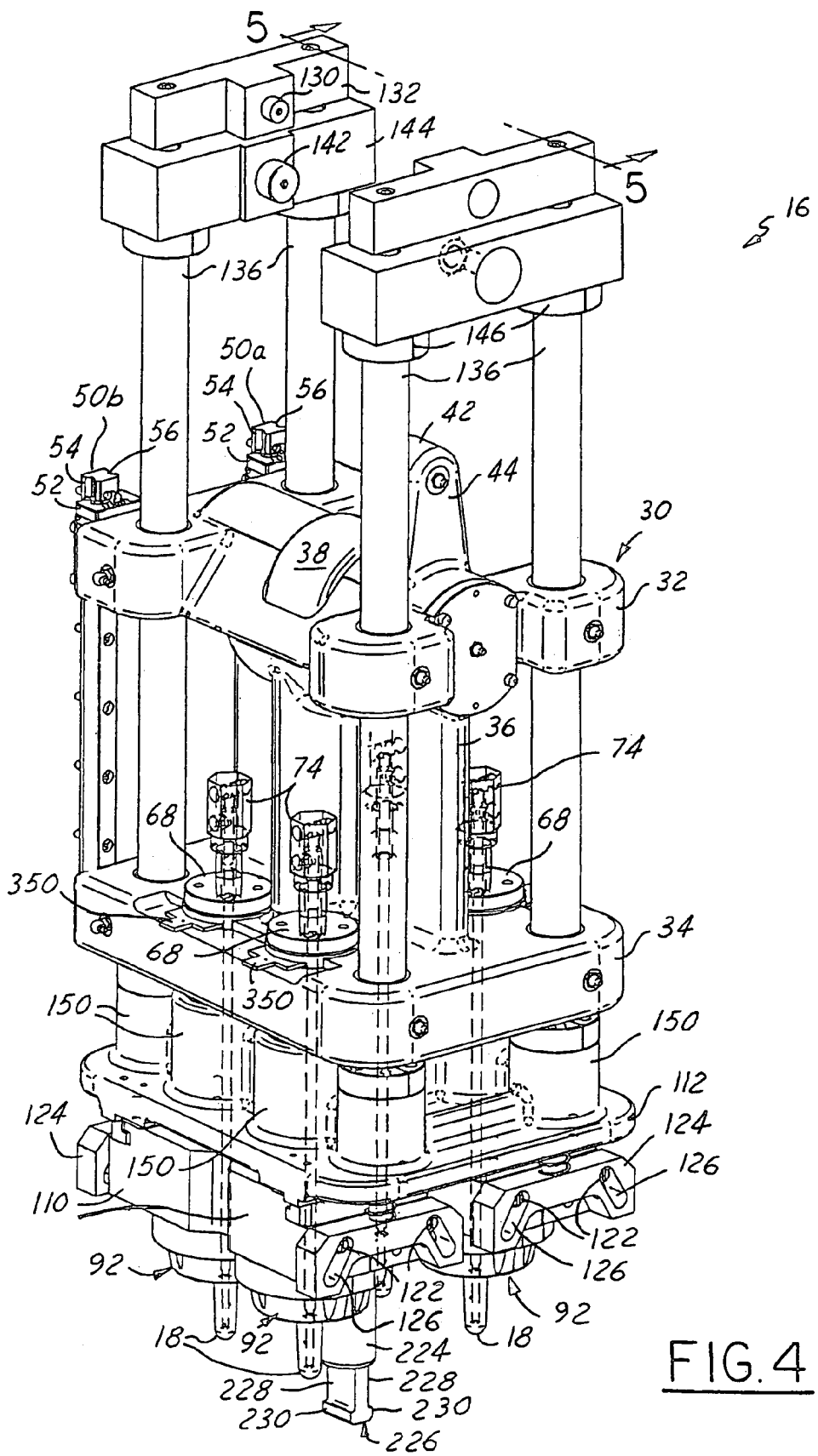
FIG. 4 is a perspective view of a first actuator of the tooling pair.
Figure 5:
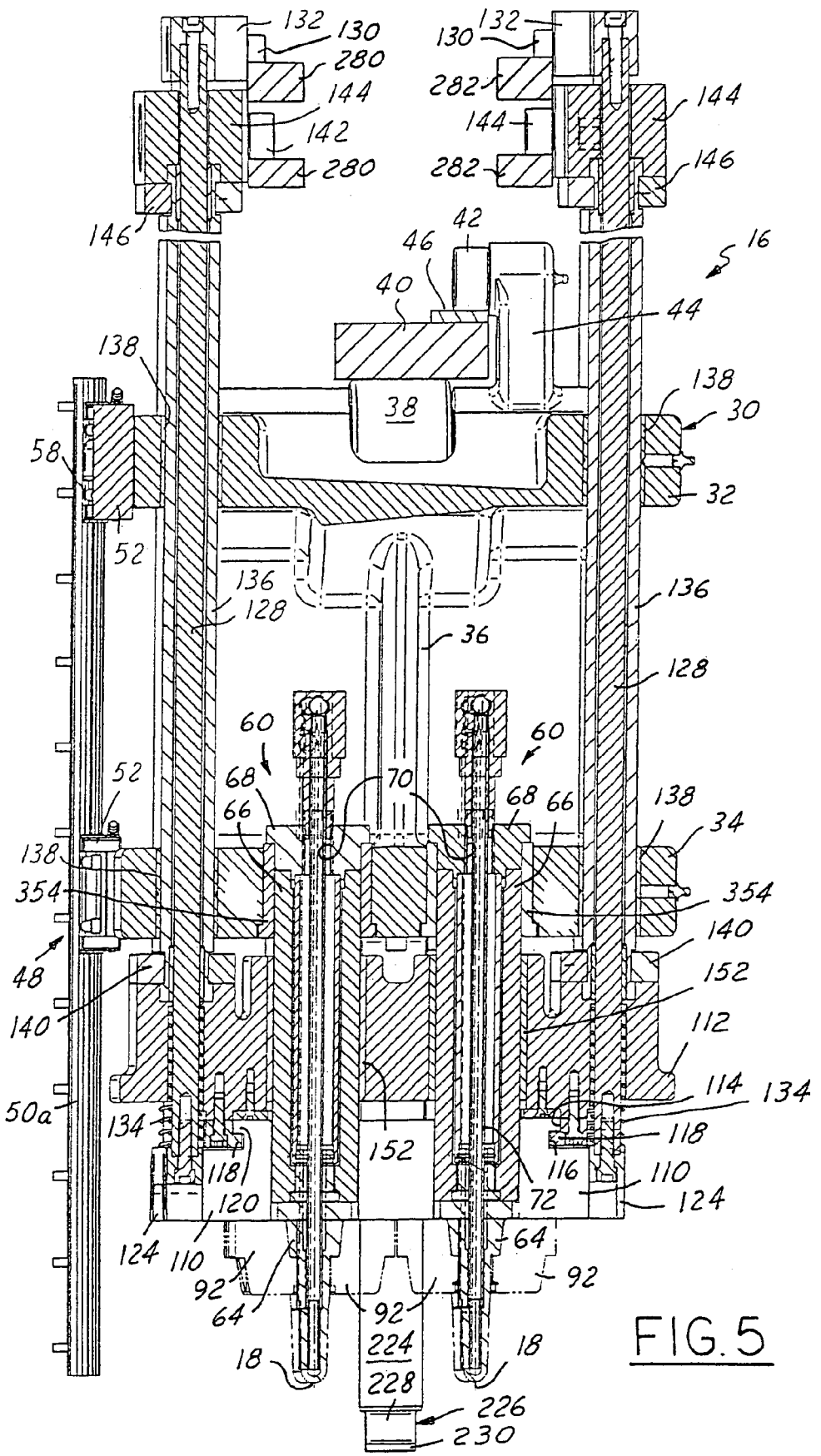
FIG. 5 is a cross-sectional view of the first actuator taken generally along line 5-5 in FIG. 4.
Figure 6:
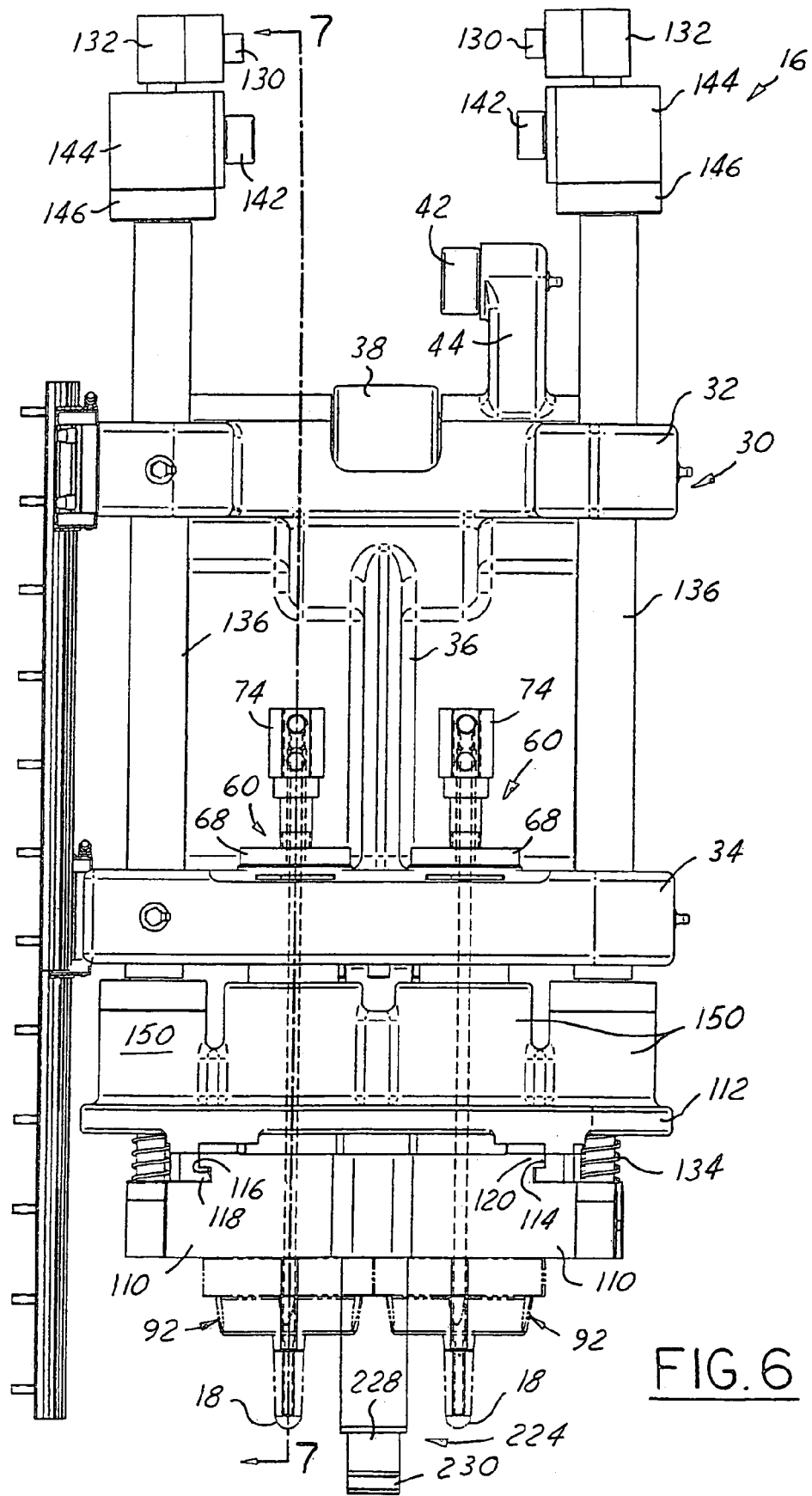
FIG. 6 is a side view of the first actuator.
Figure 7:
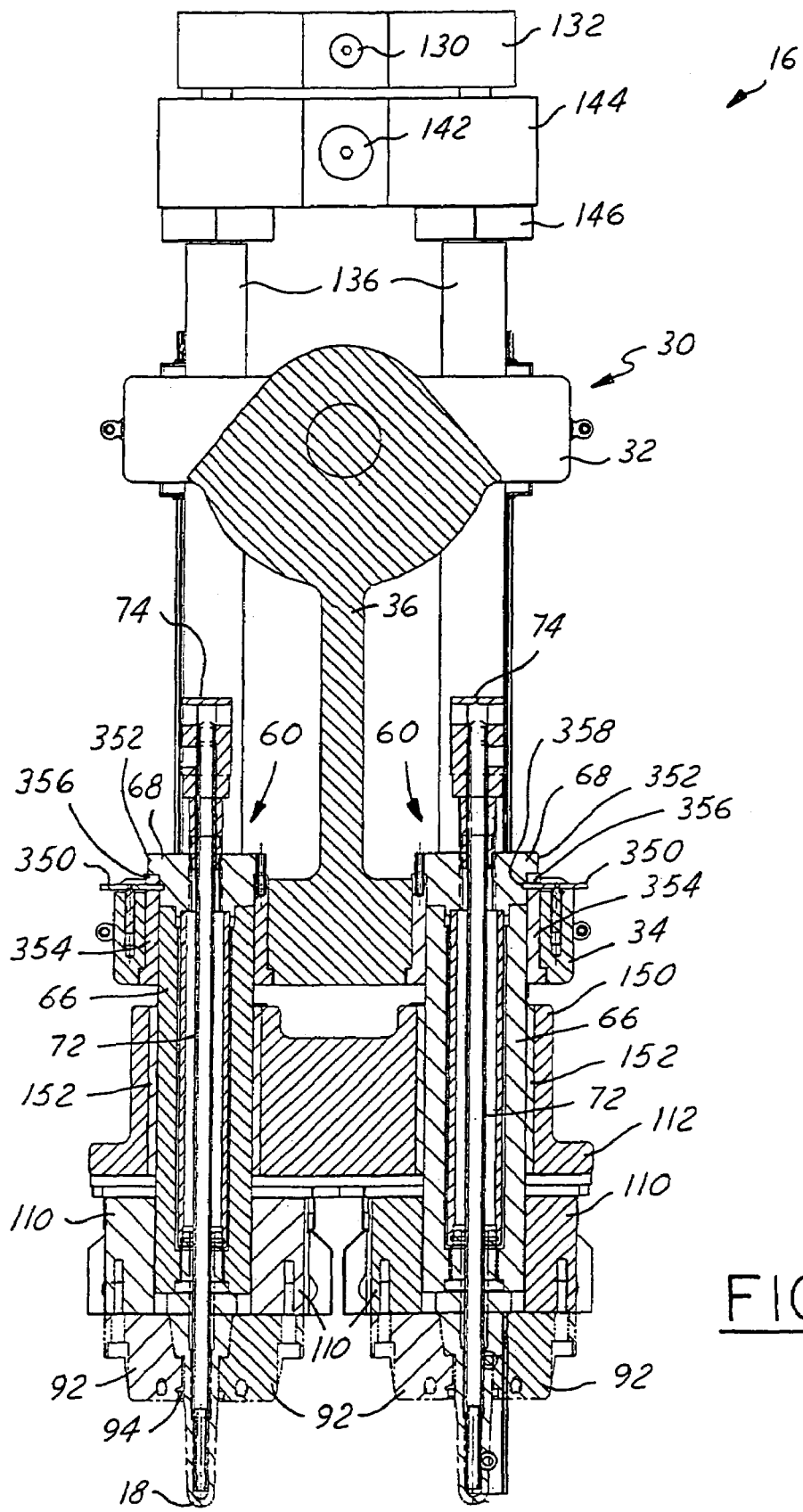
FIG. 7 is a cross-sectional view of the first actuator taken along line 7-7 in FIG. 6.
Figure 8:
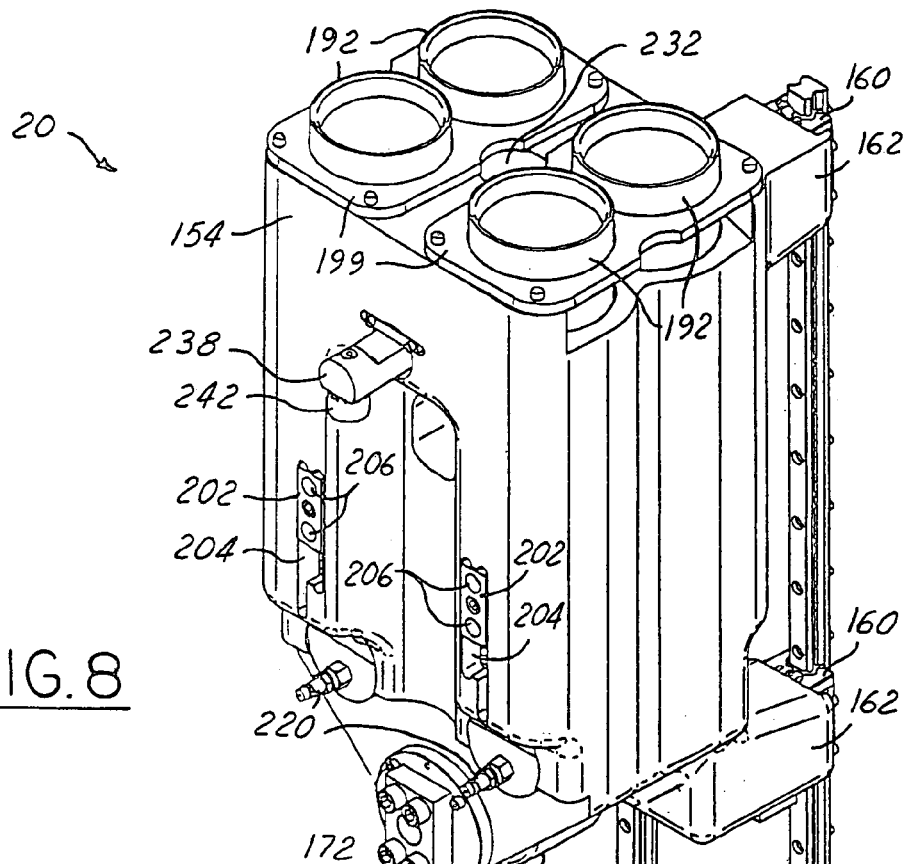
FIG. 8 is a perspective view of a second actuator of the tooling pair.
Figure 9:
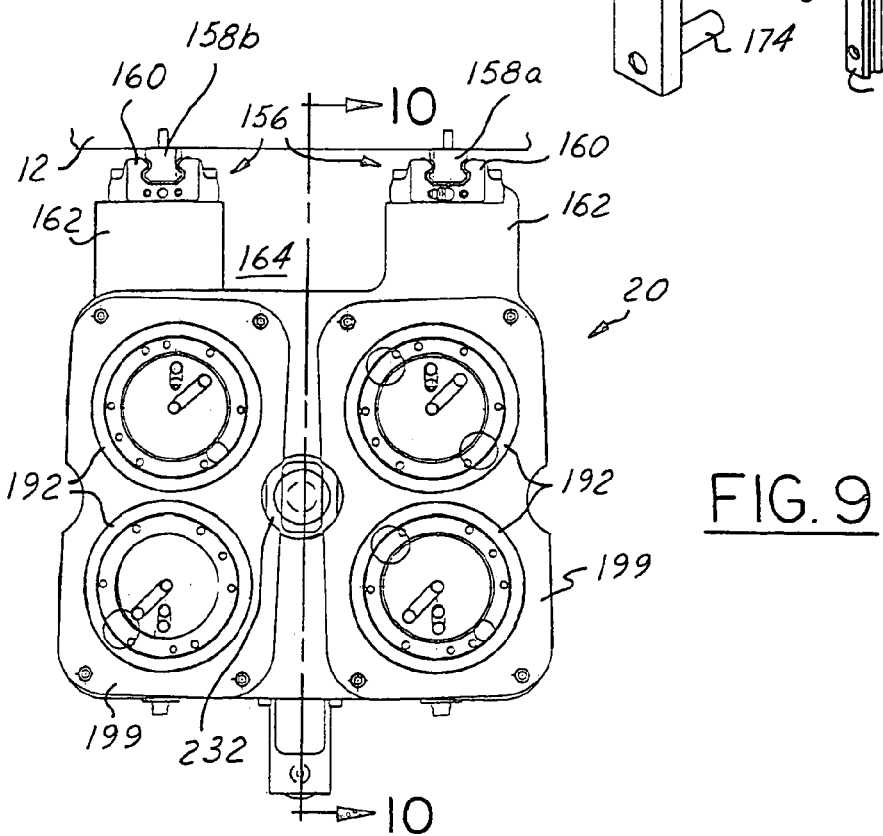
FIG. 9 is a plan view of the second actuator of the tooling pair.
Figure 20:
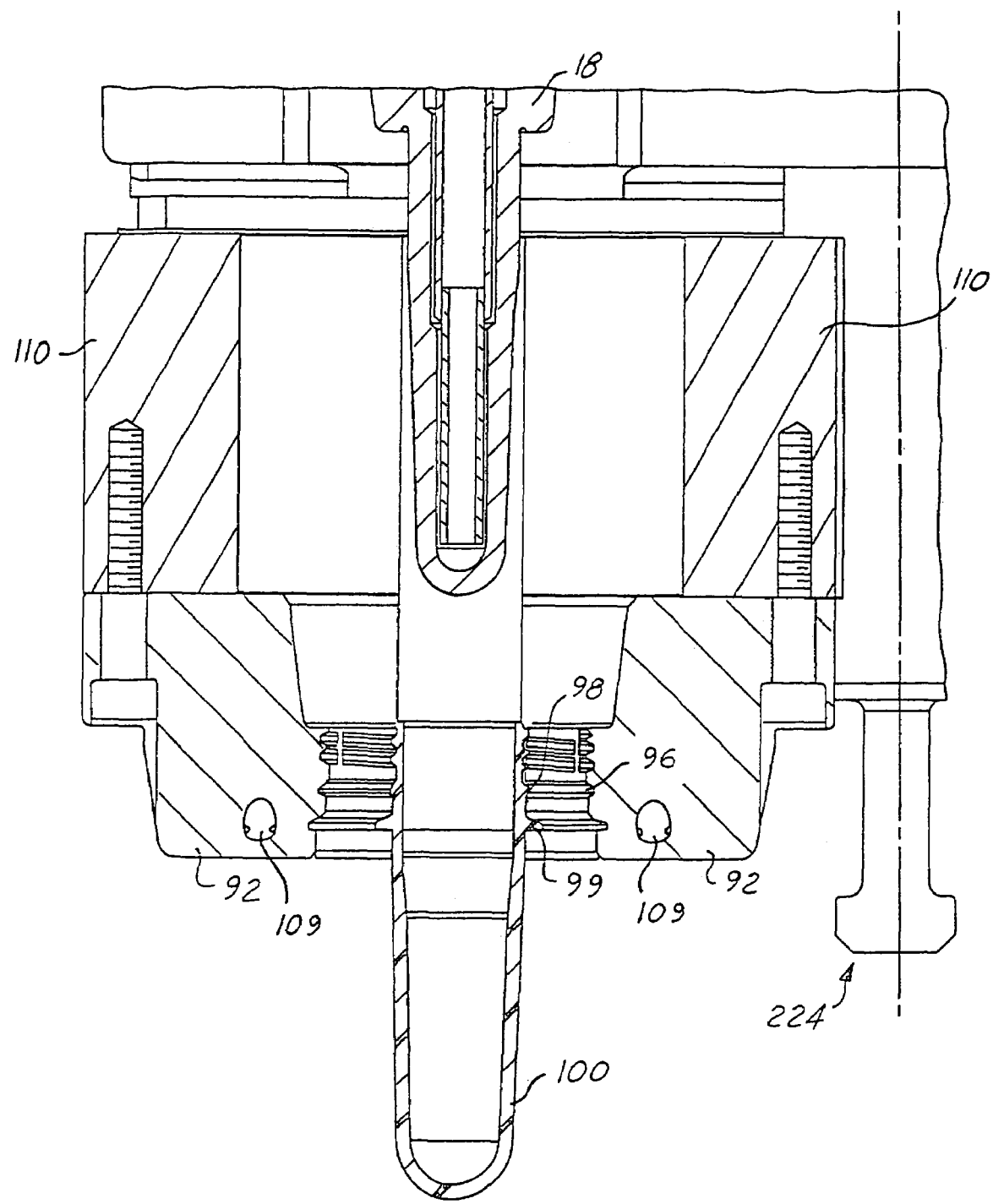
FIG. 20 is a fragmentary cross-sectional view like FIG. 17 illustrating the thread splits in their fully advanced and fully open positions with the preform removed from the core and the thread splits.

In the embodiment shown, the thread splits 92 are formed as two semi-annular halves that are driven radially between a fully open position (as shown in FIG. 20) wherein the thread splits 92 are separated from each other and spaced from the mold core 18, and a closed position (FIG. 17) wherein the thread splits 92 define a circumferentially complete annulus. As best shown in FIG. 7, each of the thread splits 92 is fixed to a separate thread split block 110. Each thread split block 110 is slidably carried by a support plate 112 through mating or interlocking slots 114, 116 and flanges 118, 120 (FIGS. 5 and 6). As best shown in FIG. 4, each thread split block 110 includes at least one follower 122 and is connected to a separate cam plate 124 with each follower 122 disposed in a respective inclined cam track 126 formed in the cam plate 124.

As best shown in FIG. 5, each cam plate 124 is fixed to an elongate inner rod 128 that extends through the support plate 112 and the upper and lower plates 32, 34 of the main body 30. Each inner rod 128 is associated with a first thread split follower 130 that is engageable with a cam surface to linearly reciprocate the inner rod 128 relative to the main body 30. Movement of the inner rod 128 drives the cam plate 124 relative to the followers 122 and thereby moves the followers 122 along the cam tracks 126 of the cam plate 124. Movement of the followers 122 displaces the thread split blocks 110 relative to the support plate 112 and thereby moves the thread splits 92 radially relative to the axis of the mold core 18 between their open and closed positions, depending on the direction of movement of the inner rod 128. Preferably, the thread splits 92 can be moved between their open and closed positions (i.e. radially displaced relative to the axis of the core) without being axially moved. Accordingly, the axial movement of the inner rod 128 causes radial movement of the thread splits 92 between their open and closed positions.

As best shown in FIGS. 4 and 5, two circumferentially adjacent inner rods 128 of a first actuator 16 are preferably connected to the same thread split follower 130 through a tie plate 132, so two thread split followers 130 and two tie plates 132 are provided for the 4 inner rods 128 of each first actuator 16 in the embodiment shown. In this embodiment of the apparatus, the tie plates 132 are radially spaced apart providing an inner tie plate and an outer tie plate. Each inner rod 128 is preferably yieldably biased in a direction moving its respective cam plate 124 toward the support plate 112, such as by a spring 134 disposed between the cam plate 124 and support plate 112. Movement of the cam plates 124 in this direction moves the thread splits 92 to their closed position.

Figure 21:
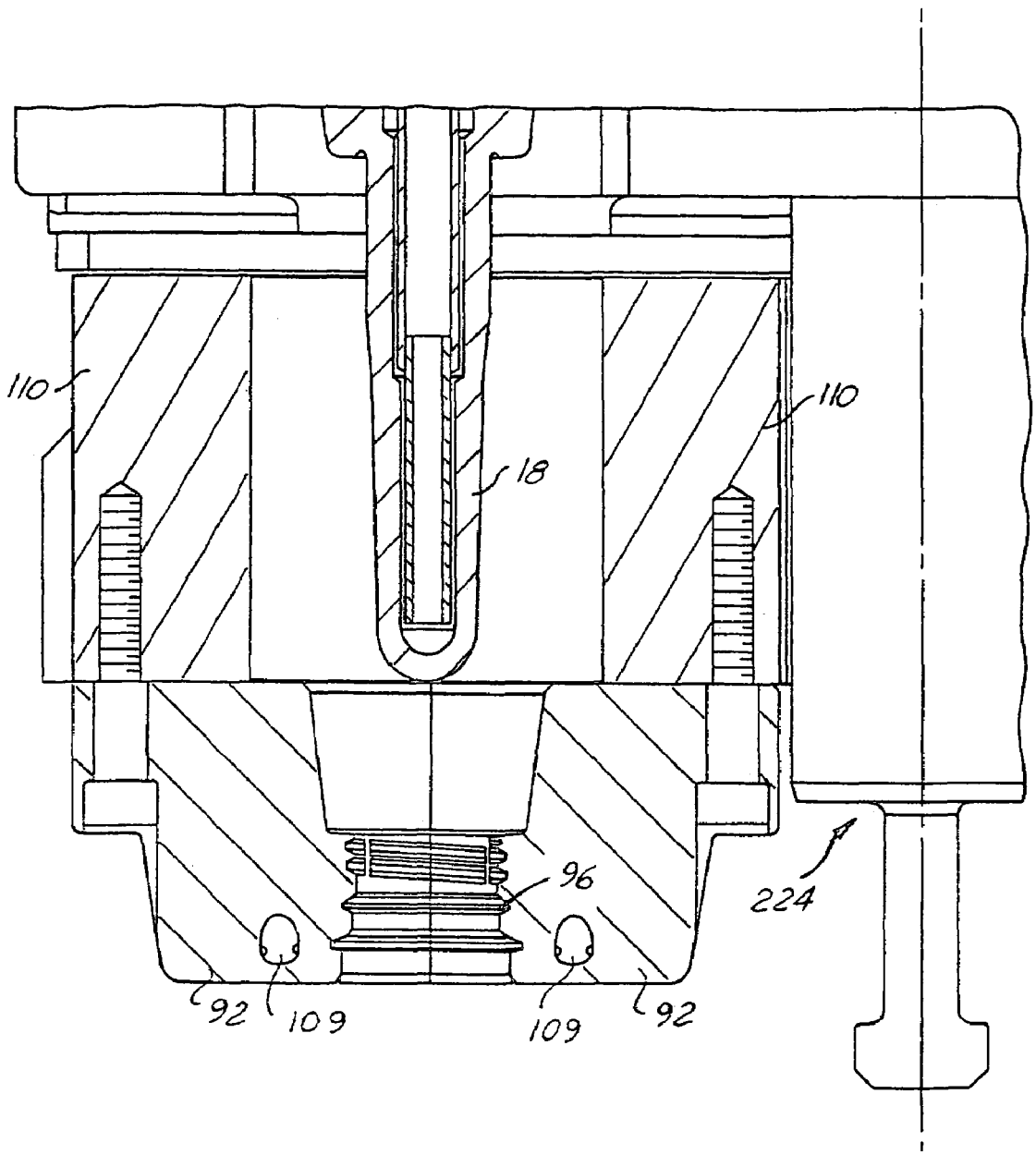
FIG. 21 is a fragmentary cross-sectional view like FIG. 20 illustrating the thread splits in their fully advanced and closed position.

Each set of thread splits 92 are driven axially relative to the mold core 18 between their retracted position best shown in FIGS. 3, 5 and 6 and their advanced position shown in FIGS. 20 and 21 by another cam assembly. Each cam assembly includes an outer sleeve 136 that slidably receives a corresponding inner rod 128 and is slidably received through bushings 138 carried by the upper and lower plates 32, 34 of the main body 30. Thus, each outer sleeve 136 is slidably movable relative to both the main body 30 and its respective inner rod 128. At one end, each outer sleeve 136 is connected to the support plate 112, such as by a split clamp 140 attached to the sleeve 136 and fixed to the support plate 112. At its other end, the outer sleeve 136 is connected to a second thread split follower 142 that is responsive to the contour of a cam surface to drive the outer sleeve 136 axially. As best shown in FIG. 2, the second thread split follower 142 is preferably attached to a tie plate 144 that spans and connects a pair of adjacent outer sleeves 136 so that a single cam follower 142 is operable to axially drive two sets of thread splits 92. Each outer sleeve 136 may be connected to its respective tie plate 144 by a split clamp 146 tightened around to the sleeve 136 and fixed to the tie plate 144 such as by one or more machine screws. Like the tie plates 132 of the inner rods 128, the tie plates 144 of the outer sleeves 136 are preferably radially spaced apart providing an inner tie plate and an outer tie plate. Accordingly, the second thread split follower 142 of each tie plate 144 is responsive to the contour of its cam surface during a portion of the rotation of the turret to axially reciprocate its respective pair of outer sleeves 136 relative to the main body 30 and thereby axially reciprocate the thread split assembly including the support plate 112, thread split blocks 110 and thread splits 92 relative to the mold core 18 which is carried by the main body 30. Because separate actuating assemblies are used to drive the thread splits 92 laterally or radially between their open and closed positions and axially between their advanced and retraced positions, these movements can be controlled separately to provide greatly improved control of the process of stripping and removing a formed plastic article 100 from the mold core 18.

As best shown in FIG. 4, to reduce the weight of the tooling, the support plate 112 can be formed of a relatively thin plate with upstanding cylindrical annular projections 150 providing an increased bearing and support area for the outer sleeves 136, as well as increased support area for the mold cores 62. As shown, the support plate 112 has eight upstanding projections 150, one for each outer sleeve 136 and one for each mold core assembly. The support plate 112 preferably carries bushings 152 surrounding the mold core assemblies to facilitate slidable movement of the support plate 112 relative to the mold core assemblies.

As best shown in FIGS. 2 and 8-11, the second actuator 20 of each tooling pair 14 includes a main body 154 and carries at least one and preferably a plurality of second or female mold sections 22 each of which define part of a separate mold cavity 24 for forming compression molded plastic articles 100. Like the first actuator 16 of each tooling pair 14, the second actuator 20 is preferably coupled to the turret 12 by linear bearings 156 permitting slidable linear reciprocation of the second actuator 20 relative to the turret 12. A pair of rails 158a,b are preferably mounted on the turret 12 such as by a plurality of machine screws, and a plurality of blocks 160 are preferably carried by the second actuator 20 for reciprocation relative to the rails 150a. The main body 154 preferably includes a generally radially extending flange 162 for each block 160 carried by the main body 154 providing a gap 164 between the main body 154 and the turret 12 that facilitates routing of coolant lines and alignment of the female mold sections 22 with the mold cores 18. Like the first actuator 16, the second actuator 20 may include two blocks 160 associated with the rail 158a that leads the other rail 158b in the direction of rotation the turret 12 with a single block 160 on the trailing rail 158b. The blocks 160 and rails 158a,b are preferably constructed in the same manner as set forth with respect to the first actuator 16 and hence, will not be described further.

Figure 10:
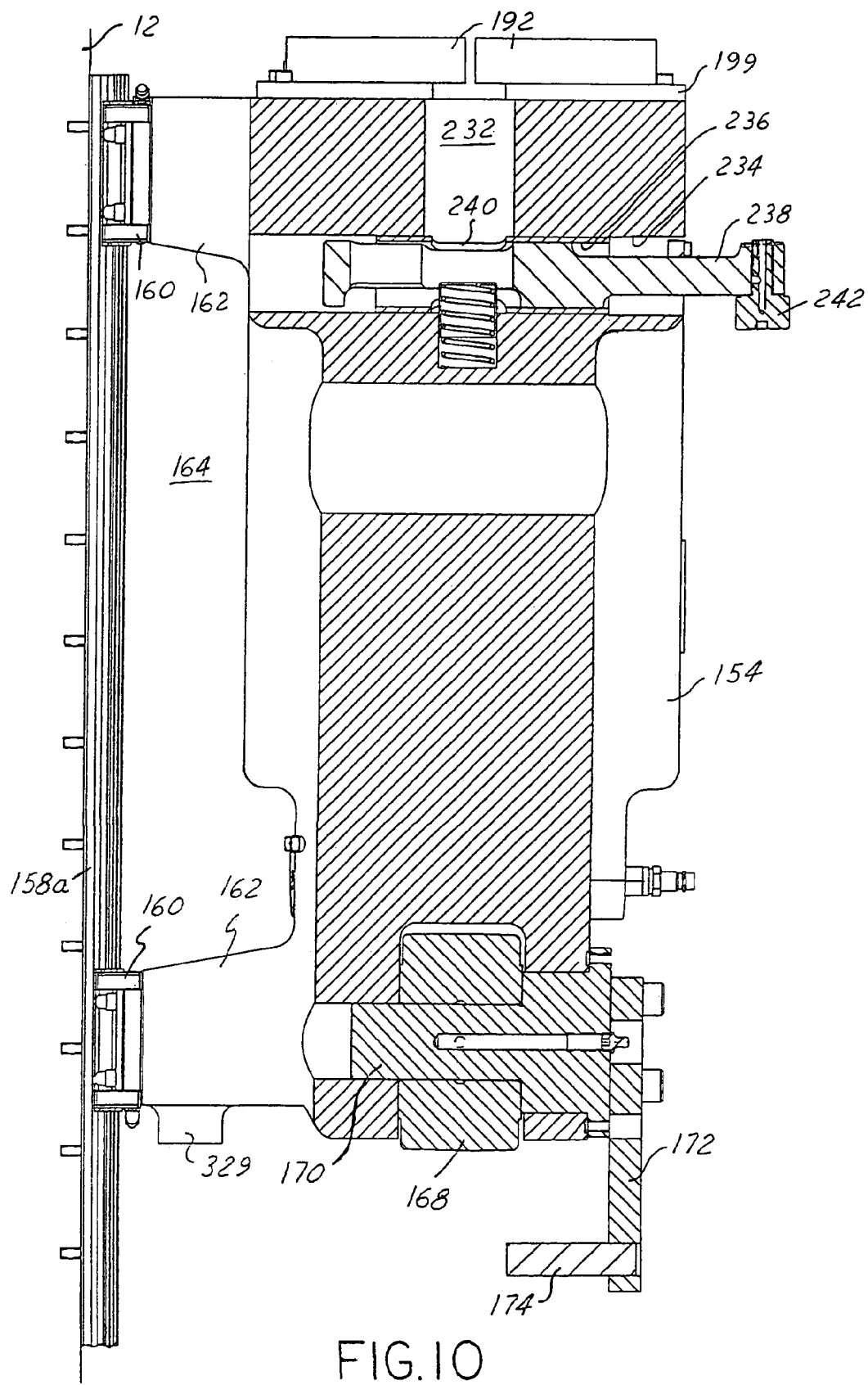
FIG. 10 is a cross-sectional view of the second actuator taken generally along line 10-10 in FIG. 9.
Figure 11:
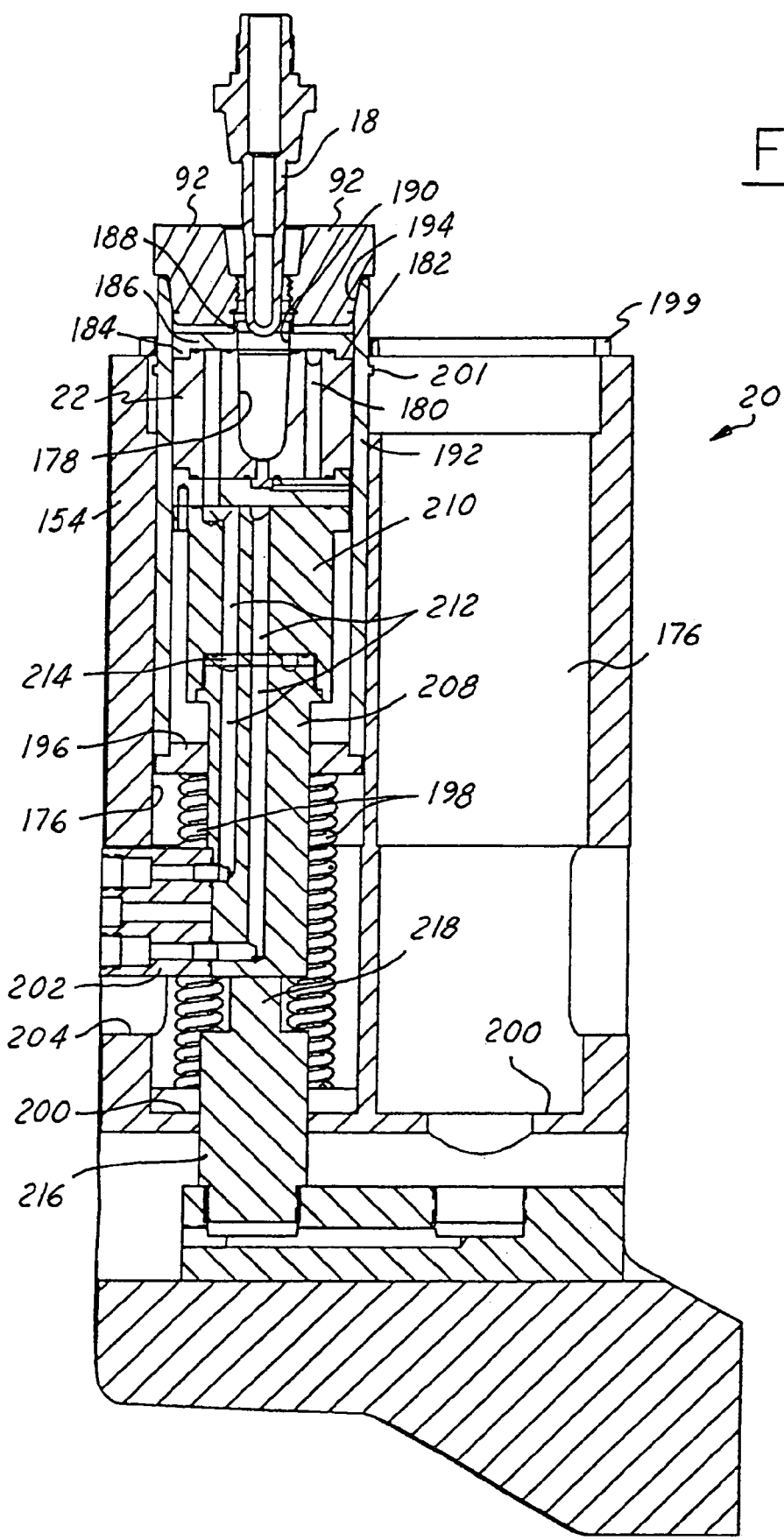
FIG. 11 is a fragmentary cross-sectional view of the second actuator of a tooling pair illustrating movement of a male mold section relative to the second actuator.

As best shown in FIG. 10, a lower main follower 168 is rotatably carried on a shaft 170 fixed to the main body 154 and is engageable with a cam surface during a portion of each revolution of the turret 12 to reciprocate the second actuator 20 relative to the turret 12, along the rails 158a,b. An axially extending bracket 172 is preferably connected to the shaft 170 at one end and has a radially inwardly extending pin 174 fixed at its other end providing a safety or hold down cam follower for the second actuator 20. The main body 154 includes at least one chamber 176, and preferably a plurality of chambers 176, each of which receives a separate female mold section 22 and related tooling. In the embodiment shown, the main body 154 has four chambers 176 each coaxially aligned with one of the mold cores 18 of the first actuator 16.

Each female mold section 22 includes a cavity 178 that defines in part the mold cavity 24 for compression molding the plastic articles 100, and one or more fluid passages 180 through which coolant flows to and from the female mold section 22. Each female mold section 22 preferably includes a circumferentially continuous peripheral groove 182 adapted to receive a peripheral depending rim 184 of a mold ring 186 disposed on the female mold section 22 in assembly. The mold ring 186 includes an axially extending annular flange 188 (best shown in FIGS. 14 and 16) surrounding a central bore 190 that defines part of the mold cavity 24 in which the plastic articles 100 are formed. The female mold section 22 and mold ring 186 are contained within a cylindrical sleeve 192 that has a first end with a circumferentially continuous radially tapered inner surface 194 adapted to engage and align the thread splits 92 with the sleeve 192 and hence, with the female mold section 22. At its other end, the sleeve 192 is received on a spring plate 196 that is acted on by one or more springs 198 disposed between the spring plate 196 and a base 200 of the chamber 176. Accordingly, the sleeve 192 is yieldably biased to an extended position tending to move the sleeve 192 out of the chamber 176 and toward the first actuator 16, and is displaced toward and against the springs 198 when engaged by the thread splits 92. In its extended position, the sleeve 192 is engaged by and facilitates aligning the thread splits 92 and mold core 18 with the female mold section 22 earlier in the compression stroke of the mold tooling. Each sleeve 192 is retained in its chamber 176 by a plate 199 connected to the main body 154 and engageable with an outwardly extending rim 201 on the sleeve 192.

Coolant is supplied to the female mold section 22 through a coolant block 202 received in an elongate or generally rectangular opening 204 communicating with the exterior of the main body 154 and having appropriate fluid conduit receiving bores 206 for connection to supply and return fluid conduits. Each coolant block 202 is fixed to an extension rod 208 which in turn is fixed to a spacer 210 leading to the female mold section 22 such that aligned passages 212 in the block 202, extension rod 208 and spacer 210 provide fluid flow into and out of the passages 180 in the female mold section 22. The extension rod 208 may include transverse passages 214 or grooves through which coolant may be directed to the coolant passages of another female mold section 22, such as the immediately adjacent and radially aligned (relative to the axis of the turret) mold section 22 in the main body 154. The extension rod 208 and spacer 210 are preferably co-axially disposed within the sleeve 192 and relative to the female mold section 22, and the mold section 22, extension rod 208 and spacer 210 are preferably maintained in alignment by the sleeve 192 and relative to the female mold section 22, with the sleeve 192 ensuring and maintaining their alignment. The sleeve 192 also provides a bearing surface for these components which can slide axially relative to the sleeve. The sleeve 192 can also slide axially relative to the female mold section 22 and related tooling.

A fluid cylinder 216, such as a nitrogen gas spring, has a plunger 218 disposed in line with the extension rod 208. The plunger 218 is acted on by pressurized fluid contained in the cylinder 216 and is adapted to move and to be responsive to movement of the female mold section 22, spacer 210 and extension rod 208 as will be discussed in more detail below. The fluid cylinder 216 is preferably charged through an inlet valve fitting 220 adapted to receive a conduit communicating with a suitable source of pressurized fluid, such as pressurize nitrogen gas. The fitting 220 preferably includes a check valve so that when the fluid cylinder 216 is charged with a pressurized fluid, the pressure therein is maintained without continuous communication with the pressurized fluid source.

A lock assembly 222 is preferably carried by the first and second actuators 16, 20 to permit the actuators 16, 20 to be retained together in their closed position as a charge of molten plastic is being compression molded. As shown in FIGS. 4-6, the first actuator 16 of each tooling pair 14 preferably includes a locking rod 224 fixed to the main body 30 at one end and including an inverted "T-shaped" key 226 at its other end. The key 226 includes a reduced diameter section defining a pair of oppositely facing flat sections 228 and a pair of laterally outwardly extending flanges 230 at the distal end of the key 226. The locking rod 224 is preferably centered between the mold cores 18 and relative to the main body 30 of the first actuator 16.

Figure 24:
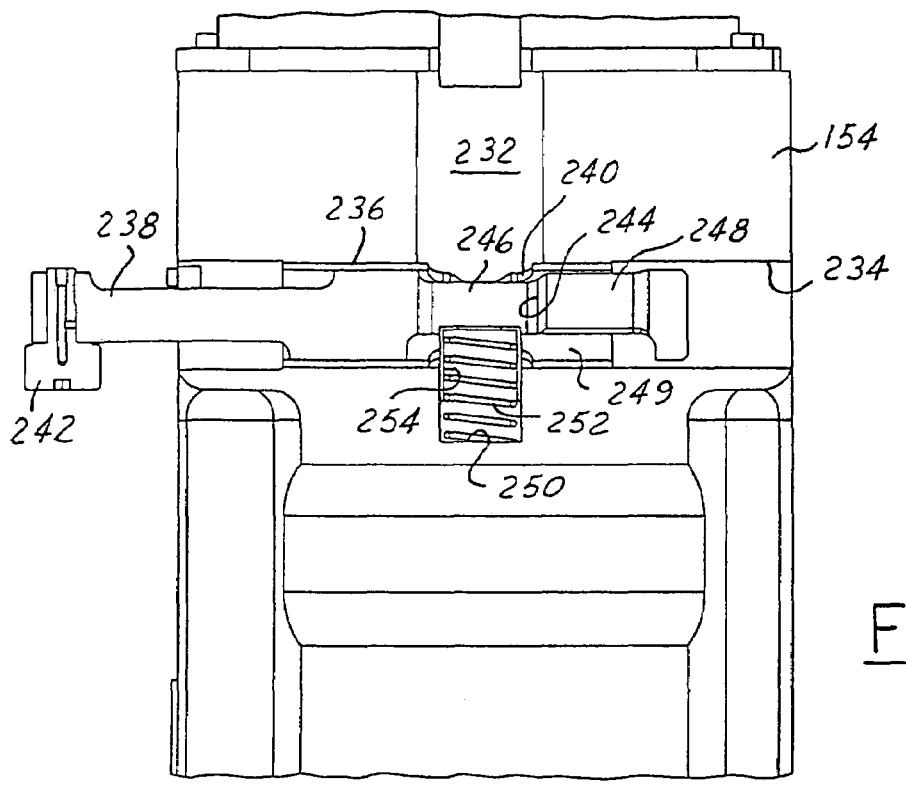
FIG. 24 is a fragmentary cross-sectional view of a lock assembly carried by the second actuator.
Figure 25:
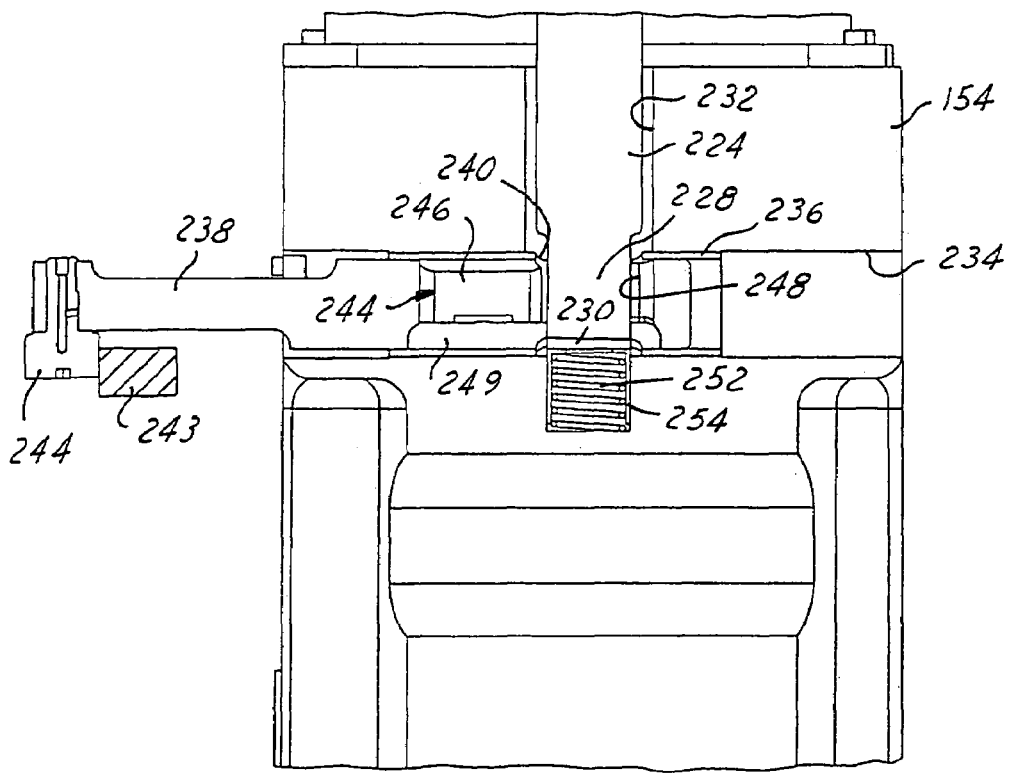
FIG. 25 is a fragmentary cross-sectional view illustrating the lock assembly in its locked position.
Figure 26:
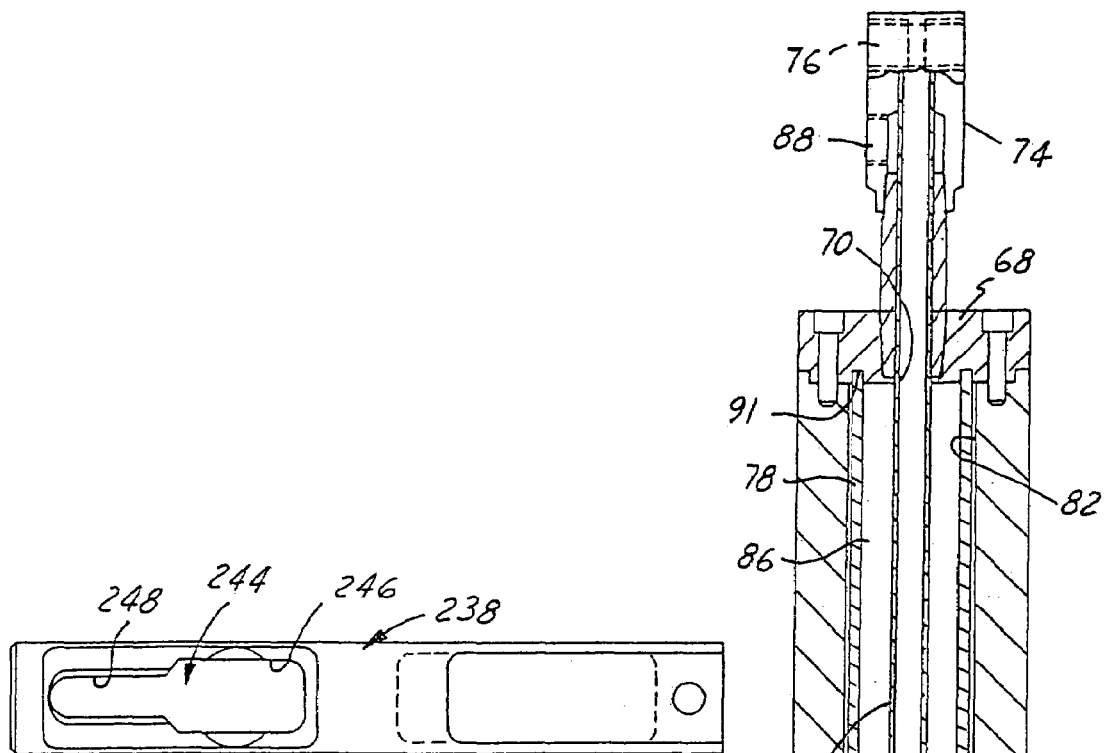
FIG. 26 is a plan view of a slide bar of the locking assembly.
Figure 27A:
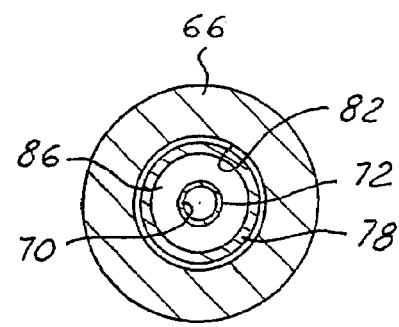
FIG. 27A is a cross-sectional view taken along the line 27A-27A in FIG. 27.
Figure 27:
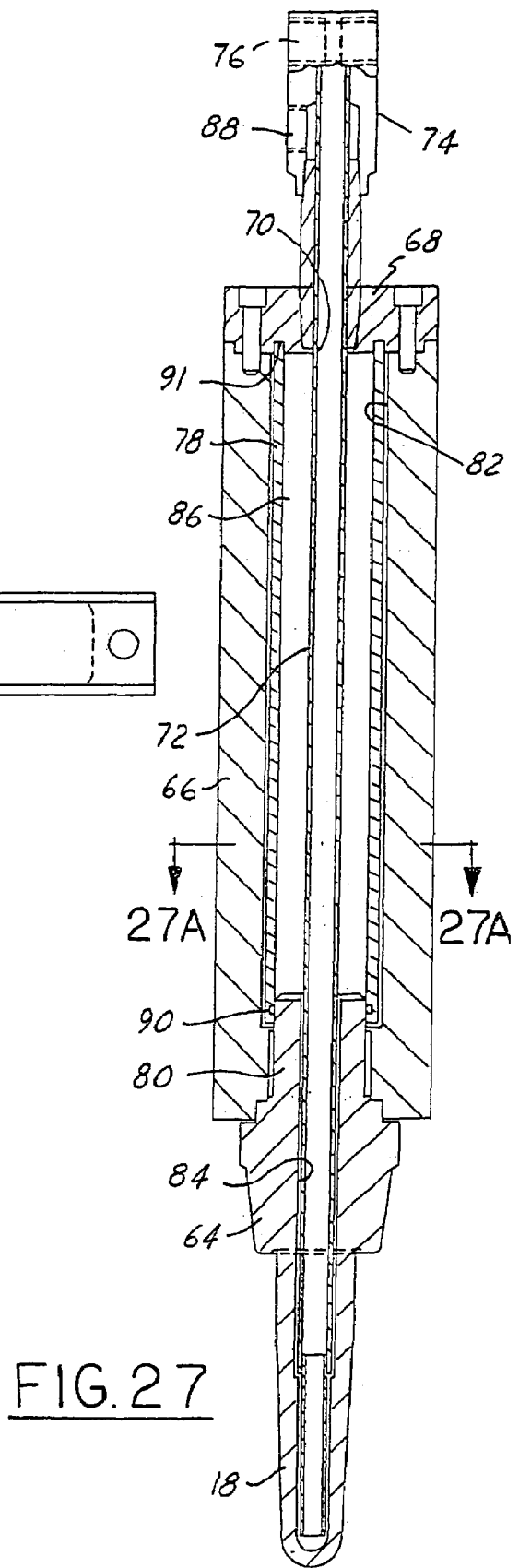
FIG. 27 is a cross-sectional view of a mold core assembly.

As shown in FIGS. 8-10, 24 and 25, the second actuator 20 of each tooling pair 14 includes a central bore 232 axially aligned with the locking rod 224 carried by the first actuator 16 and adapted to slidably receive the locking rod 224 therein. The main body 154 of each second actuator 20 also includes a transverse bore 234 intersecting the bore 232. A tubular barrel 236 is disposed in the transverse bore 234 and a cam actuated slide bar 238 is slidably received within the barrel 236 with a free end extending out of the transverse bore 234. The barrel 236 is preferably closely received in the transverse bore 234 and has a transverse through hole 240 aligned with the bore 232 and adapted to receive the key 226 of the locking rod 224 therein. The slide bar 238 has a cam follower 242 attached to its free end that is responsive to the contour of a cam surface 243 to move the slide bar 238 within the barrel 236 and transverse bore 234. The slide bar 238 also has a contoured slot 244 formed between its ends, extending through the slide bar 238 and aligned with the bore 232 and through hole 240 in assembly. The slot 244 includes an entrance portion 246 having a width sufficient to receive the key 226 of the locking rod 224, and specifically wide enough to receive the outwardly extending flanges 230 at the end of the key 226, and a narrower retaining portion 248 having a width that is less than the width of the key 226 in the area of the flanges 230, but greater than the width of the key 226 in the area of the flat sections 228 above the flanges 230. As best shown in FIGS. 24 and 26, the slide bar 238 is recessed in the area of one side of the slot 244 providing a gap 249 between the slide bar 238 and barrel 236 adapted to receive the flanges 230 of the key 226 when the actuators 16, 20 are closed together. A blind bore 250 axially aligned with the bore 232 receives a spring 252 maintained therein by a cage 254 extending partially into the barrel 236 and the slot 244 of the slide bar 236. In its uncompressed or extended state, as shown in FIG. 24, the spring 252 and cage 254 maintain the entrance portion 246 of the slot 244 generally aligned with the bore 232.

To lock together the first and second actuator 16, 20, the main bodies 30, 154, respectively, of the first and second actuators 16, 20 are moved together so the locking rod 226 is received within the bore 232. As best shown in FIG. 25, full advancement of the first actuator 16 and second actuator 20 toward each other engages the locking rod 226 with the spring 252 and cage 254 and compresses the spring 252 so that the cage 254 is moved clear of the slide bar 238, enabling movement of the slide bar 238 relative to the barrel 236 and locking rod 224. The key 226 of the locking rod 224 is received in the entrance portion 246 of the slot 244 until the outwardly extending flanges 230 of the key 226 are received in the gap 249 on the lower side of the slide rod 238. To prevent withdrawal of the locking rod 224 from the bore 232, the slide bar 238 is displaced laterally outwardly so that the retaining portion 248 of the slot 244 is registered with the flat sections 228 of the locking rod 226 and the slide bar 238 overlies the outwardly extending flanges 230 of the key 226. This prevents axial movement of the locking rod 224 relative to the slide bar 238.

Preferably, the lateral movement of the slide bar 238 is controlled by engagement of the follower 242 with one or more cam surfaces during the desired portion of the rotation of the turret 12. Also preferably, the locking rod 224 and bore 232 are provided centered between the mold cavities 24 of each tooling pair 14 so that the forces tending to separate the first and second actuators 16, 20 act axially through the locking rod 224 to reduce the likelihood of bending or misalignment of the tooling and actuators. Put another way, the locking rod 224 preferably extends along the centerline of the forces tending to separate the first and second actuators 16, 20 when they are locked together. The locking rod 224 is therefore under tension when the actuators 16, 20 are locked together with the tension force in the locking rod 224 preferably extending along its axis.

When it is desired to unlock the first and second actuators 16, 20, the first actuator 16 is moved further toward the second actuator 20 removing the flanges 230 of the locking rod 224 from direct engagement with the slide bar 238 so that the slide bar 238 can be retracted until the entrance portion 246 of the slot 244 is aligned with the flanges 230. In this orientation the locking rod 224 can be removed from the slot 244 and bore 232.

In operation, the turret 12 rotates continuously at constant angular velocity. During a portion of a revolution of the turret 12 the first and second actuators 16, 20 are brought into engagement with upper and lower main cam assemblies 260, 262 defined at least in part by arcuate cam plates carried by a frame 264 adjacent the periphery of the turret 12. The cam plates extend along a portion of the periphery of the turret 12 and include cam paths for the various followers on the first and second actuators 16, 20 to control movement of the actuators 16, 20 relative to each other, and the thread splits 92 relative to the mold cores 18 as will be discussed in more detail below.

Figure 29:
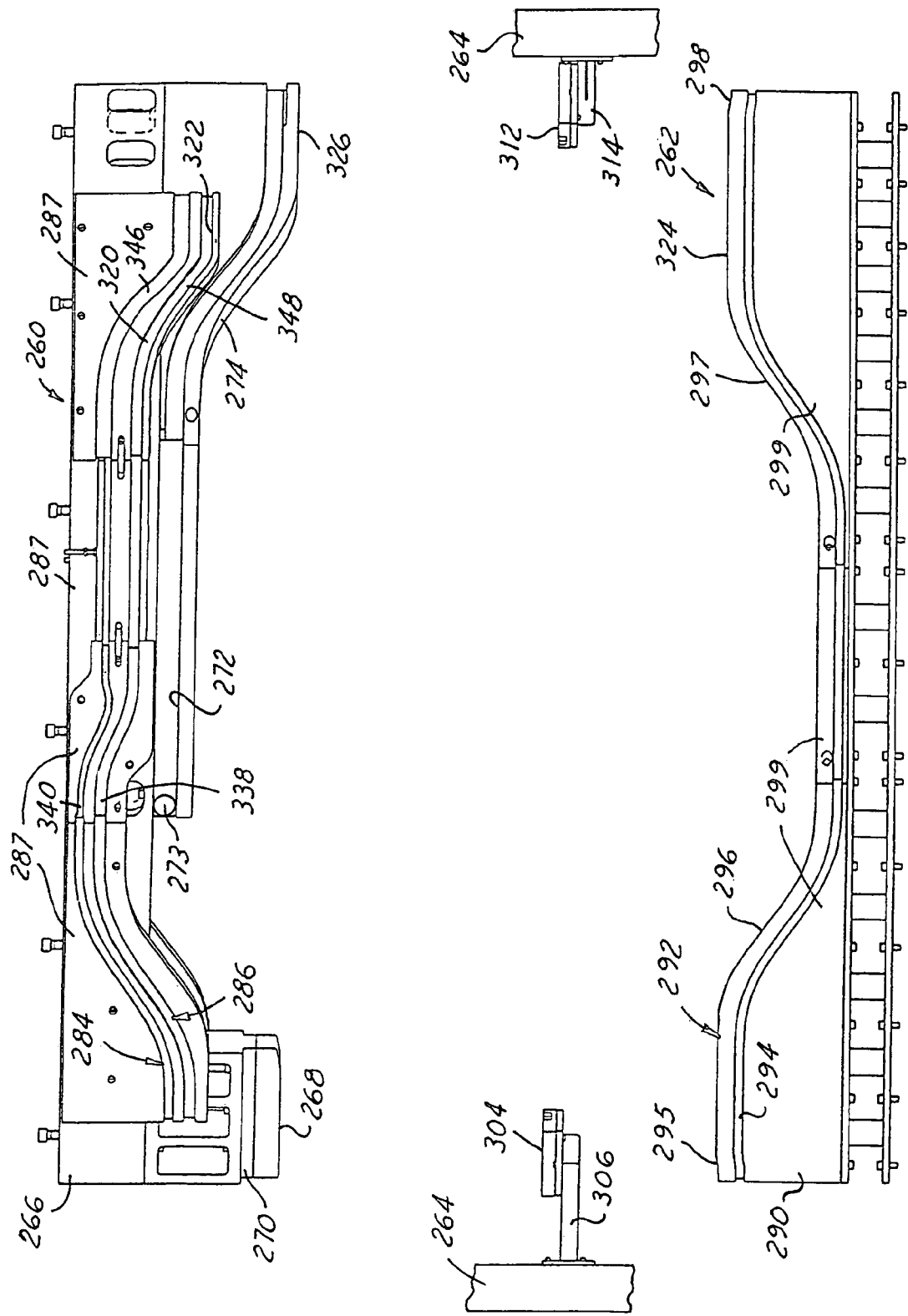
FIG. 29 is a side view of a pair of cam plates defining a plurality of cam surfaces used to drive the mold tooling.

The upper main cam assembly 260 (FIGS. 1B, 29 and 30) includes a central cam plate 266 with cam surfaces disposed to engage the first and second upper followers 38, 42, respectively. At one end of the central plate 266, a hold down cam surface 268 is provided for engagement with the first upper follower 38 to facilitate unlocking the actuators 16, 20 as will be discussed in more detail below. A groove 270 adjacent to the hold down cam surface 268 receives the second upper follower 42. Spaced downstream (relative to the direction of turret rotation) from the hold down cam surface 268 is a hold up cam surface 272 formed by a groove 273 in the central cam plate 266 that is adapted to receive the second upper follower 42 to maintain the vertical or axial position of the first actuator 16 main body 30 so that the thread splits 92 can be driven relative to the main body 30. Downstream of the hold up cam surface 272 is a main upper closing cam surface 274 engageable with the first main follower 38 to move the first actuator 16 toward the second actuator 20. As shown in FIG. 29, the cam surfaces 268, 272, 274 along the central plate 266 may each be provided on separate plates or modules fixed to the central plate 266, with appropriate adjustable mounting mechanisms to enable accurate positioning and alignment of the plates or modules and cam surfaces. Providing the cam surfaces 268, 272, 274 on separate plates or modules facilitates changing out the cam surfaces for repair or replacement, and also permits different cam modules or plates to be installed to change the shape of the cam paths and cam surfaces and thereby change the movement of the first actuator 16 of each tooling pair 14. The cam surfaces 268 and 274 are examples of cams referred generally to as reference number 40 and as shown generally in FIG. 5. Cam surface 272 is an example of a cam referred generally to as reference number 46 and as shown generally in FIG. 5.

To drive the first and second thread split followers 130, 142, an inner set of cam plates 280 and an outer set of cam plates 282 are mounted on the central cam plate 266. Both the inner set and outer set of cam plates 280, 282 define a pair of separate cam paths 284, 286. A first cam path 284 in each set of plates 280, 282 is adapted to receive the first thread split 130 followers of the first actuator 16 with the follower 130 carried by the inner tie plate 132 received in the cam path 284 of the inner set of cam plates 280 and the follower 130 carried by the outer tie plate 132 received in the cam path 284 of the outer set of cam plates 282. Likewise, a second cam path 286 in each of the inner and outer sets of cam plates 280, 282 is adapted to receive the second thread split 142 followers of the upper actuator 16, with the second follower 142 of the inner tie plate 144 received in the second cam path 286 of the inner set of cam plates 280 and the second follower 142 carried by the outer tie plate 144 received in the second cam path 286 of the outer set of cam plates 282. The cam paths 284, 286 are preferably formed as a track or groove in the cam plates 280, 282 that extend generally circumferentially and perpendicular to the axis of the turret 12, and have axially sloped cam surfaces that drive the followers 130, 142 axially to move the first actuators 16 or thread splits 92 as desired. The cam paths 284, 286 are preferably defined in plates or modules that are separately attached to the central cam plate 266 or apparatus frame 264. Providing the cam paths 284, 286 in separate plates or modules facilitates changing the plates for maintenance, repair or to provide differently oriented cam paths to change the movement of the thread splits 92. Preferably, as noted above, the thread splits 92 can be driven between their open and closed positions independently of being driven between their advanced and retracted positions. This provides control over the movement of the thread splits 92 as formed plastic articles 100 are stripped and removed from the mold cores 18 and enables changing of path and timing of movement of the thread splits 92 as desired for a given plastic article 100 or manufacturing process.

The lower main cam assembly 262 includes an arcuate lower cam plate 290 having an outer surface 292 with axially sloped cam surfaces adapted to engage the lower main follower 168 of the second actuator 20. A corresponding groove 294 formed in the lower cam plate 290 is preferably evenly axially spaced from the outer surface 292 and defines a cam path for the pin follower 174 that may be used as a safety cam to ensure that the second actuator 20 remains adjacent to or in contact with the lower cam plate 290. The cam surfaces of the lower cam plate 290 include at least a lift off cam surface 295, a lower opening cam surface 296, a lower closing cam surface 297 and a set down cam surface 298. The various cam surfaces 295, 296, 297, 298 of the lower cam plate 290 can be formed on separately attached plates or modules to facilitate replacement, repair or changing of the cam profiles. The lower cam plate 290 is generally circumferentially aligned with the upper main cam assembly 260 so that the main cam assemblies 260, 262 are encountered by their respective actuators 16, 20 during the same portion of the turret revolution 12.

Desirably, the upper and lower main cam assemblies 260, 262 are positioned along an arc of about 80 to 110 degrees along the circumference of the turret 12. During this portion of the turret's rotation as the actuators 16, 20 are passed along the cam assemblies 260, 262, the actuators 16, 20 are unlocked and opened, formed articles 100 are stripped from the mold cores and removed by a take out mechanism, fresh plastic charges are delivered to the mold cavities 24, and the actuators 16, 20 are closed, locked back together and set down onto a bracket (not shown) on the turret 12 where they remain for the rest of the turret's rotation as the articles 100 are molded.

Figure 28:
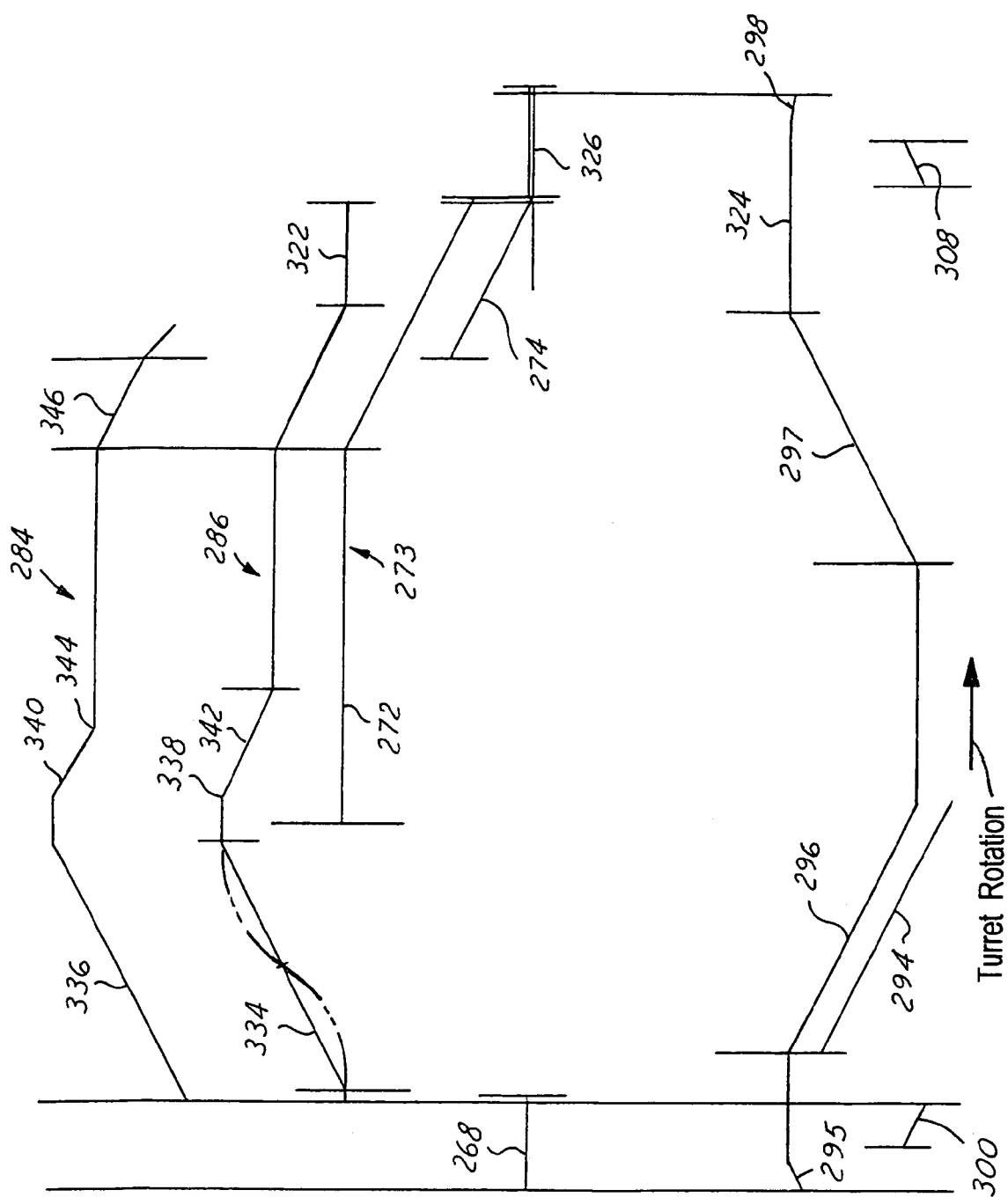
FIG. 28 is a diagrammatical view showing the position of various cams relative to the rotational orientation of a turret of the compression molding apparatus of FIG. 1.
Figure 30:
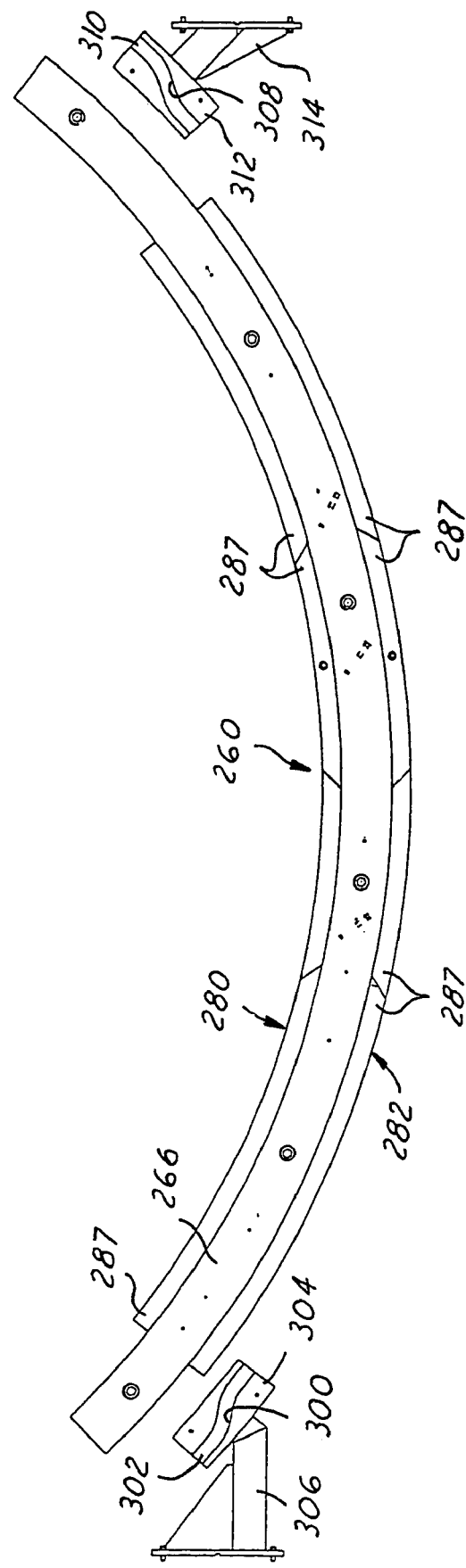
FIG. 30 is a plan view of the cam plates of FIG. 29.

As best shown in FIGS. 29 and 30, to unlock the actuators 16, 20 and permit their relative movement in accordance with the main cam assemblies 260, 262, an unlock cam surface 300 is disposed at an upstream end of the cam assemblies 260, 262. The unlock cam surface 300 is preferably defined in a track 302 formed in plate 304 carried by a bracket 306 fixed to the frame 264 so that the track 302 receives the slide bar follower 242 to move the slide bar 238 to its retracted position and permit the actuators 16, 20 to be separated as discussed above. As best shown in FIGS. 29 and 30, to lock the actuators 16, 20 together after they are closed during a compression stroke of the molding process, a locking cam surface 308 is provided at the downstream end of the cam assemblies 260, 262. The locking cam surface 308 is preferably defined in a track 310 formed in plate 312 carried by a bracket 314 fixed to the frame 264 so that the track 310 receives the slide bar follower 242 to move the slide bar 238 to its advanced or extended position and permit the actuators 16, 20 to be separated as discussed above As best shown in FIGS. 1 and 2, during a portion of each turret 12 revolution, the actuators 16, 20 are moved to their open position spaced from each other to receive a charge or pellet of plastic in the cavity 178 of each female mold section 22. After the charges of plastic are delivered to the female mold sections, continued rotation of the turret 12 engages the main followers 38, 168 of both the first and second actuators 16, 20 with their respective closing cam surfaces 274, 297 which are sloped toward each other to cause the actuators 16, 20 to move toward each other in a compression stroke phase of the forming process. As best shown in FIG. 28, in this embodiment, the lower closing cam surface 297 is offset from the upper closing cam surface 274. So, the second actuator 20 begins moving toward the first actuator 16 before the first actuator 16 moves toward the second actuator 20. Also, the second actuator 20 stops moving toward the first actuator 16 before the first actuator 16 stops moving toward the second actuator 20. A more detailed discussion of the movement of the actuators 16, 20 and the relative positions of the male mold sections 18 and female mold sections follows below.

As the first and second actuators 16, 20 are advanced toward each other each set of thread splits 92 is in its closed and advanced position, as shown in FIG. 21, which is the position the thread splits 92 are in after a previously formed article 100 has been removed from the mold core 18. As shown in FIG. 28, as the turret 12 rotates and the first upper follower 38 engages the upper closing cam surface 274, the second thread split follower 142 also engages a thread split advancing cam surface 320 so that the thread splits 92 are advanced toward the second actuator 20, preferably at the same time and at the same rate as the first actuator 16 to maintain the thread splits 92 in their advanced position relative to the mold core 18. Continued movement of the first actuator 16 and thread splits 92 engages the outer tapered surface 102 of the thread splits 92 with the inner tapered surface 194 of the sleeve 192 to ensure proper alignment of the actuators 16, 20 during the compression stroke.

After the thread splits 92 are seated on the sleeve 192 with the shoulder 108 engaged with the upper end of the sleeve 192, continued rotation of the turret 12 engages the second thread split followers 142 with a holding cam surface 322 that is preferably perpendicular to the direction of movement of the thread splits 92 between their advanced and retracted positions so that the thread splits 92 are not moved further toward the second actuator 20. Preferably, as shown in FIGS. 28 and 29, at or about this same time, the lower closing cam surface 297 ends and the lower main follower 168 traverses a lower holding cam surface 324 that extends generally perpendicular to the linear bearings so that the second actuator 20 is no longer advanced toward the first actuator 16.

Figure 12:
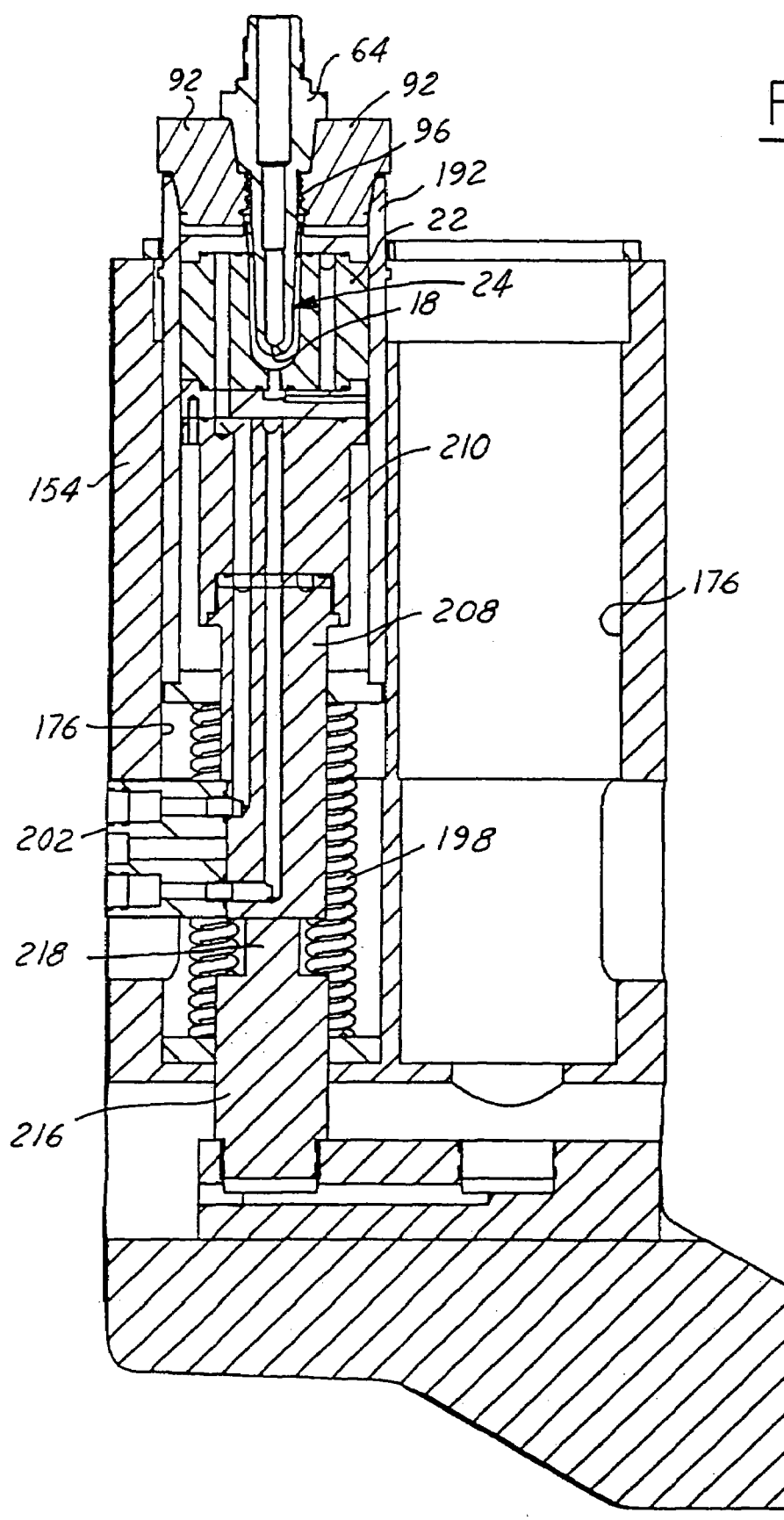
FIG. 12 is a cross-sectional view like FIG. 11 illustrating further movement of the male mold section relative to the second actuator.

When the second thread split followers 142 and the lower main follower 168 initially engage their respective holding cam surfaces 322, 324, the first upper follower 38 is still engaged with and moving along the upper closing cam surface 274 causing the first actuator 16 to move towards the second actuator 20. This also moves the mold core 18 relative to the thread splits 92 and, as shown in FIG. 12, disposes the free end of the mold core 18 into the cavity 178 of the female mold section 22 and engages the mold core 18 with the thread splits 92 to close the mold cavity 24. When the first upper follower 38 reaches the end of the upper closing cam surface 274 and reaches an upper hold down cam surface 326, that maintains the position of the first actuator 16 without further advancing it toward the second actuator 20, the first and second actuators 16, 20 are fully closed together. The advancement of the mold core 18 into the mold cavity 178 compresses and displaces the plastic material therein causing the plastic to flow within and fill the mold cavity 24, including the area between the thread splits 92 and the mold core 18. In this area, external threads 98 and a radially outwardly extending flange 99 are formed on the plastic article.

With the first and second actuators 16, 20 fully closed, the locking rod 224 is fully received in the bore 232 with its key in the slot 244 in the slide bar 238. Continued rotation of the turret 12 engages the lock follower 242 with the locking cam surface 308 (FIGS. 28 and 30) to move the slide bar 238 relative to the locking rod 224 to the position shown in FIG. 25 with a portion of the slide bar 238 overlying the flanges 230 of the locking rod 224. In this position, the slide bar 238 prevents withdrawal of the locking rod 224 from the bore 232, and holds the first and second actuators 16, 20 together. Now, the loads on the upper and lower main followers 38, 168 that were applied by the holding cams to maintain the actuators 16, 20 closed, can be removed. In other words, no holding cams are needed for the remainder of the compression molding portion of the turret 12 revolution. This removes the load on the apparatus frame 264, with the compression molding forces and the reactionary forces tending to separate the first and second actuators 16, 20 acting on and resisted by the lock assembly 222 and the actuators 16, 20. After being locked together, the actuators 16, 20 encounter the set down cam surface 298 in the lower cam plate 290 which lowers the locked together actuators 16, 20 onto a bracket 328 (FIG. 1B) carried by the turret 12 with the bracket 328 supporting the actuators 16, 20 until further cams are encountered to lift off bracket 328, unlock and open the actuators. At least one of the first and second actuator includes a support such as flange 329 (FIG. 10) adapted to engage the bracket 328.

As the turret 12 rotates further, the plastic charge in each mold cavity 24 is compression molded, and begins to cool and cure. As the plastic cools, it shrinks or contracts and its volume is reduced. To maintain a desired compression force in each mold cavity 24, the fluid cylinder 216 urges and moves the female die section 22 toward the male core 18 as the plastic volume reduces. As shown in FIGS. 15 and 16, in the embodiment shown, the upward movement of the female mold section 22 engages the mold ring flange 188 with the radially outwardly extending flange 99 being formed on the preform and provides a groove 330 or undercut in the flange 99 of the plastic preform.

After the plastic preforms are compression molded, they need to be removed from the mold cavities 24 and from the mold cores 18. To do this, as shown in FIG. 28, continued rotation of the turret 12 engages the lower main follower 168 with the lift off cam surface 295 of the lower cam plate 290 that raises the locked together actuators 16, 20 off of the support bracket 328. Further turret 12 rotation brings the upper main follower 38 into engagement with the hold down cam surface 268 on the central cam plate 266 to move the first actuator 16 slightly further toward the second actuator 20 and thereby relieve the tension force on the locking rod 224. Further turret 12 rotation engages the lock follower 242 with the unlock cam surface 300 which moves the slide bar 238 to its retracted position and aligns the entrance portion 246 of the slot 244 with the locking rod 224 so the locking rod 224 can be withdrawn from the bore 232 when desired.

After the lock assembly 222 is unlocked, further turret 12 rotation engages the first and second thread split followers 130, 142 with respective opening cam surfaces 334, 336 in their cam paths 284, 286 moving the first actuator 16 away from the second actuator 20. Preferably at or about this same time, the lower main follower 168 encounters the lower opening cam 296 and the second actuator 20 moves away from the first actuator 16. As the actuators 16, 20 are opened, the formed articles 100 must be stripped and removed from the tooling and fresh charges of plastic must be delivered to each mold cavity 24.

Figure 18:
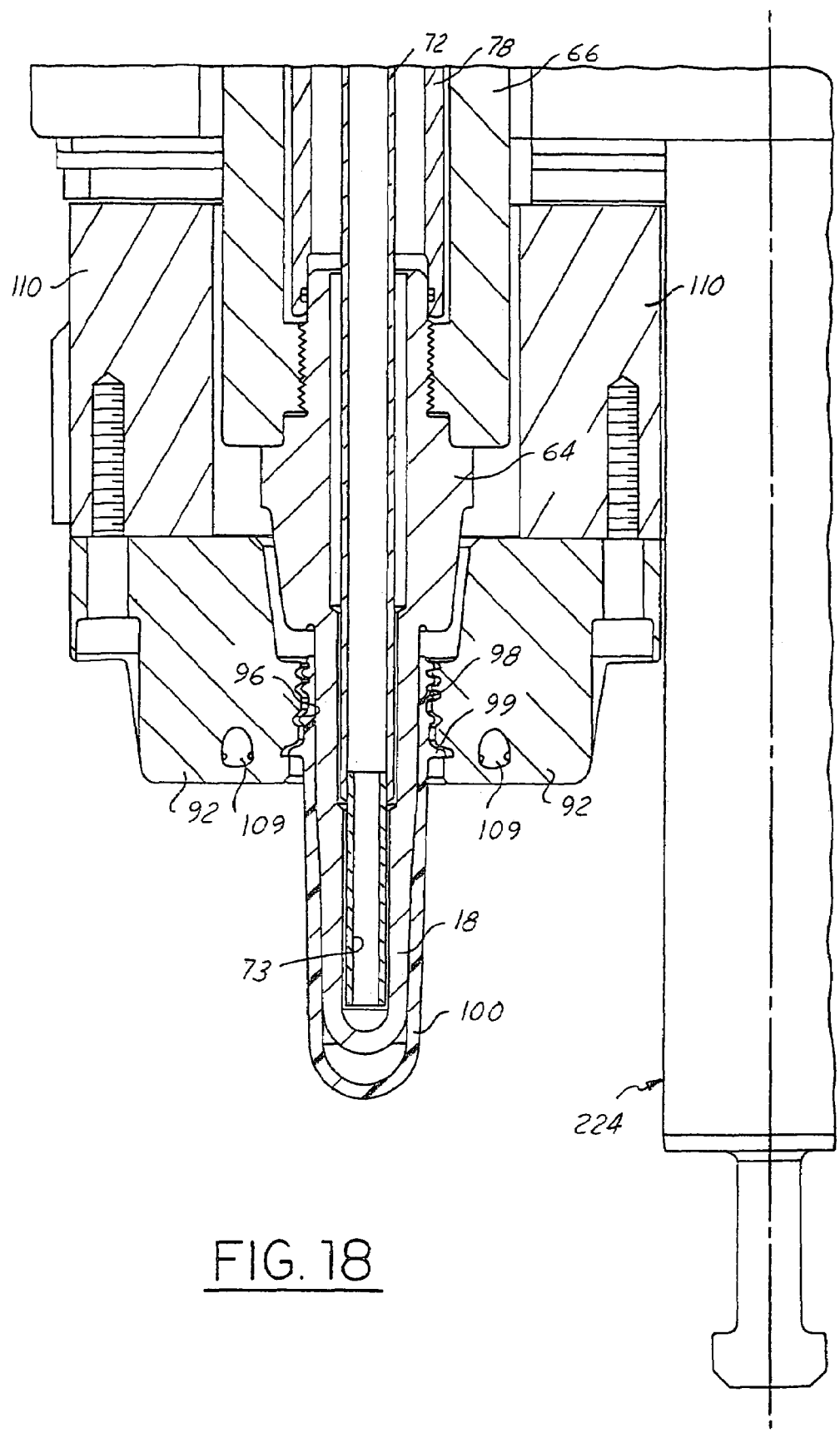
FIG. 18 is a fragmentary cross-sectional view like FIG. 17 illustrating an initial opening of thread splits and a core of the male mold section away from the preform.
Figure 19:
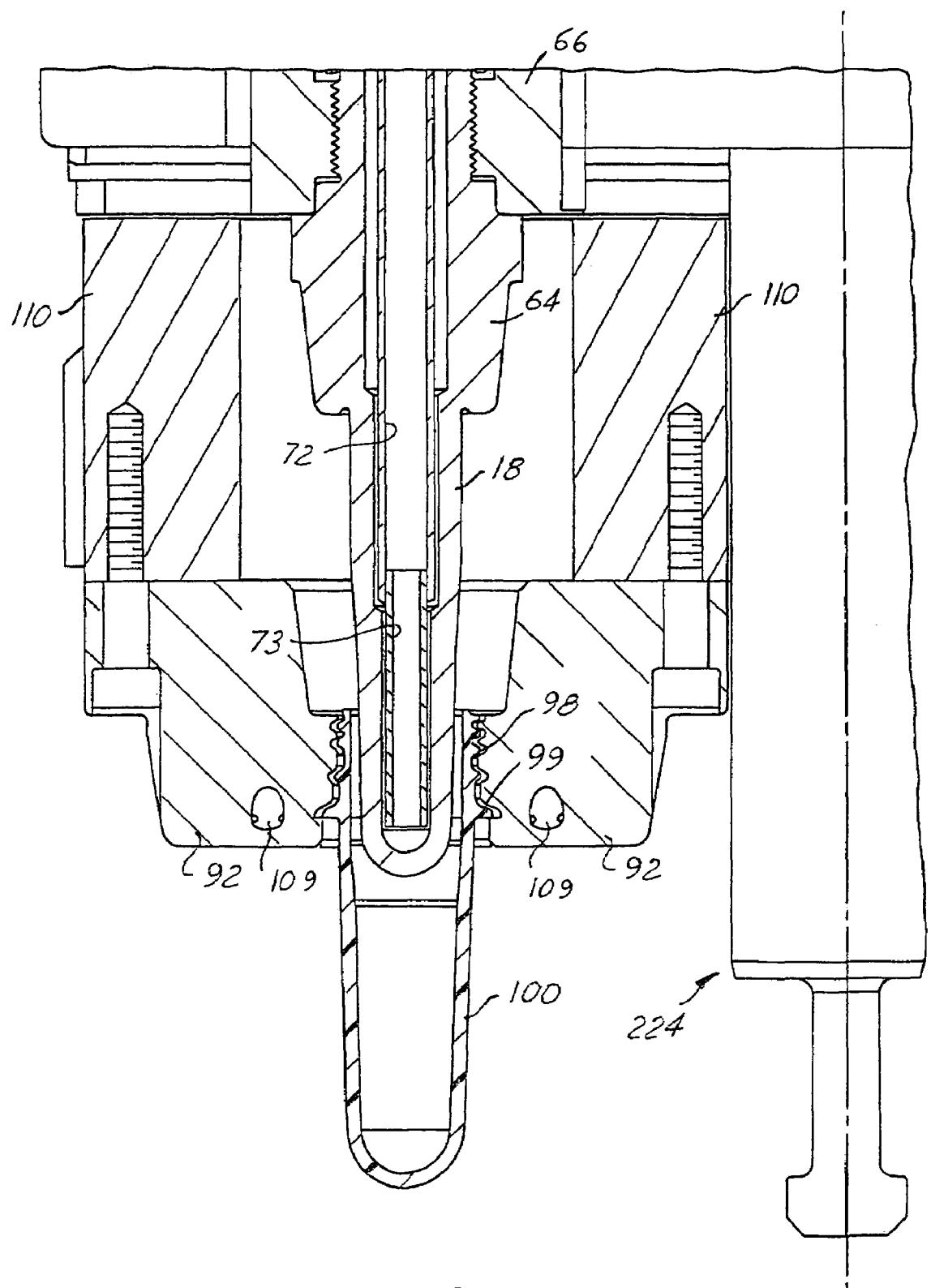
FIG. 19 is a fragmentary cross-sectional view like FIG. 18 illustrating further movement of the thread splits toward their advanced position to remove the preform from the core.

Removal of the formed articles 100 from the tooling will be described with reference to FIGS. 17-21 and also FIGS. 28-30 for reference to the cam surfaces. As the actuators 16, 20 are moved toward their fully open positions, each formed article is carried by its associated thread splits 92 and mold core 18. Rotation of the turret 12 engages the second thread split follower 142 with a cracking cam surface 338 that initially axially moves the thread splits 92 relative to the mold core 18 toward their fully advanced position to release or crack the article 100 off of the mold core 18. After or as the article 100 is moved slightly relative to the core 18, the first thread split follower 130 is engaged with a cracking cam surface 340 that initially laterally separates the thread split halves 92 a first distance from each other and loosens their connection to the article 100, as shown in FIG. 18. As shown in FIG. 19, although the thread splits 92 have been separated, they are still close enough together to carry the article 100 as the thread splits 92 are further advanced relative to the mold core 18 by engagement of the second thread split follower 142 with an appropriate cam surface 342 and the article 100 is removed from the mold core 18. When the mold core 18 is clear of the article 100, the first thread split follower 130 engages a thread split opening cam surface 344 that moves the thread splits 92 to their fully open position, as shown in FIG. 20, to release the article 100 from the thread splits 92.

After the article is clear of the thread splits 92, they can be moved back to their closed position, as shown in FIG. 21, by engaging the first thread split follower 130 with a thread split closing cam 346 (FIG. 28) so that the thread splits 92 are in position to begin the next compression stroke. The second thread split follower 142 travels along an ejection following cam 348. Preferably, the springs 134 disposed around the inner rods 128 ensure that the thread splits 92 are returned to their closed positions before the next compression stroke to avoid potential damage to the tooling if the thread splits 92 are not closed and are advanced toward the second actuator 20.

For example, even if the first thread split follower 130 associated with a given set of thread splits 92 became broken so the follower 130 did not engage a cam surface to drive the thread splits 92 to their closed position, the thread splits 92 would be closed by the force of the springs 134.

In one presently preferred aspect of the invention as shown and described, the actuators 16, 20 are protected from serious damage by several features or mechanisms. First, the mold core assemblies 60 are preferably mounted to the main body 30 by a releasable coupler. In one presently preferred embodiment, as best shown in FIGS. 4 and 7, shear plates 350 are fixed to the main body, such as by screws, to releasably mount the mold core assemblies 60 to the main body 30. More specifically, each cap 68 preferably includes a radial flange 352 overlying an annular retainer 354 carried by the lower plate 34. Each retainer 354 has a slot 356 to receive part of a shear plate 350 which preferably also extends into an aligned slot 358 in the cap 68. Thus, in normal operation, the mold core assembly is prevented from moving relative to the main body 30. Should undue loads be exerted on the first actuator 16 via a mold core 18, due to a tooling crash or presence of an obstruction between the mold core 18 and female mold section 22, the shear plates 350 are designed to break to free the mold core 18 from the main body 30 before the cam plates and followers are damaged. The shear plates 350 are easier and less costly to fix and the mold cores 18 are easier and less costly to remount to the main body 30 than repairing or replacing the cam plates. Also, if an obstruction exists between the core 18 and female mold section 22, the female mold section 22 can be displaced against the fluid cylinder 216 to prevent damage to the mold core 18 or female mold section 22. Of course, break-away or releasable couplings other than shear plates can be used between the mold cores and main body to protect the tooling.

Figure 22:
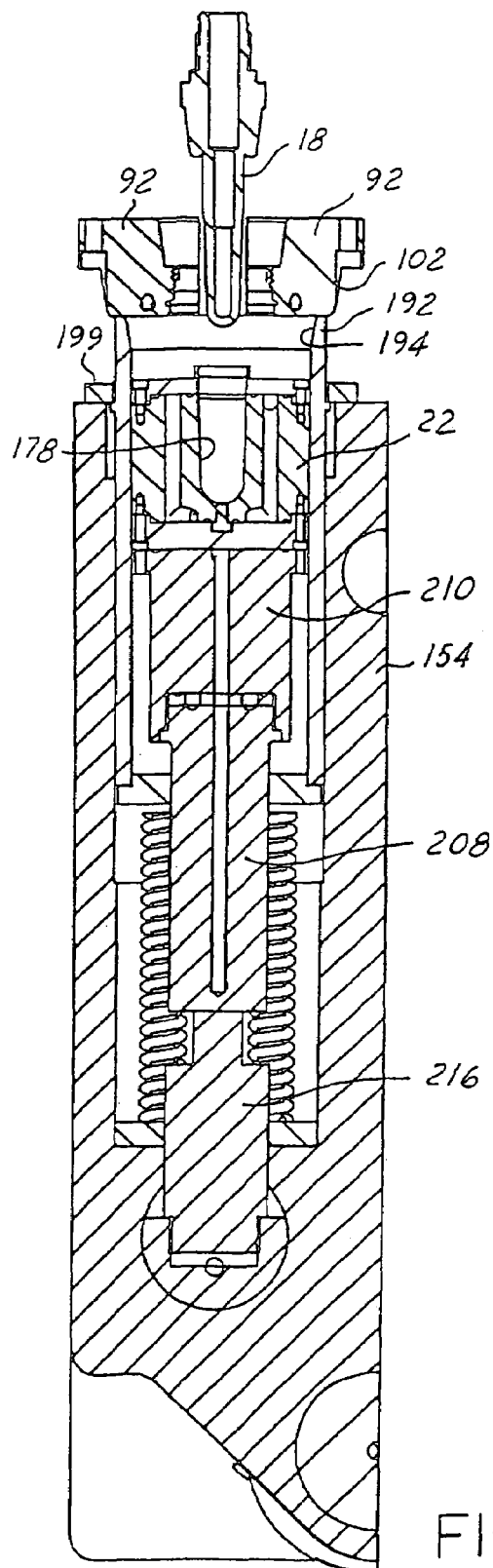
FIG. 22 is a fragmentary cross-sectional view illustrating the male mold section and the second actuator during a thread split open crash on a mating portion of a female mold section of the second actuator.
Figure 23:
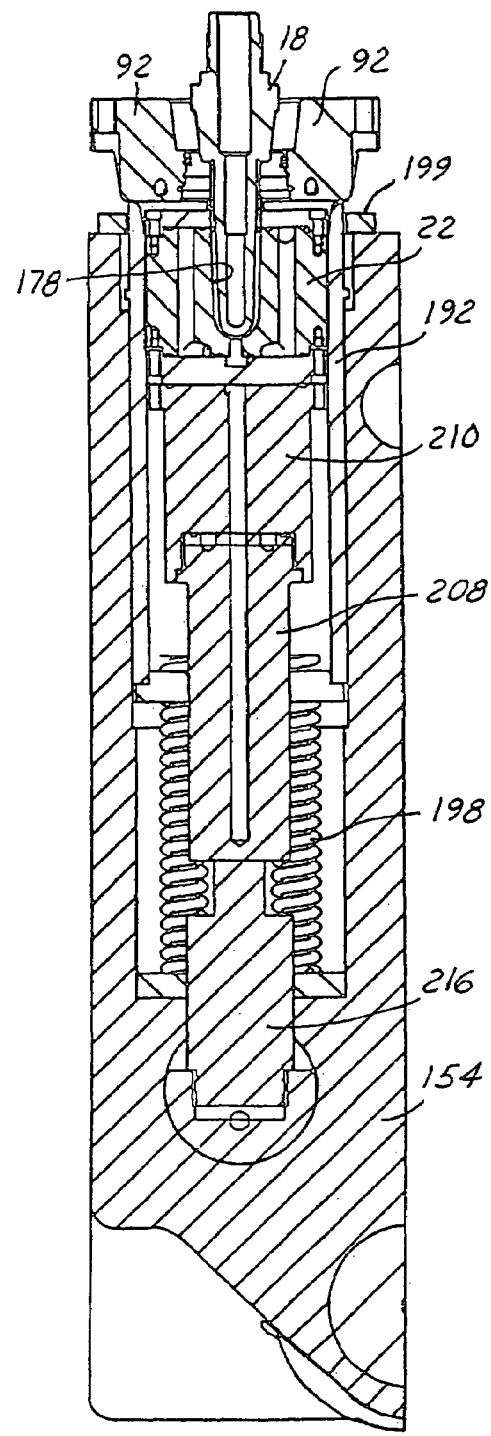
FIG. 23 is a fragmentary cross-sectional view like FIG. 22 illustrating further advancement of the male mold section doing the thread split open crash.

Next, if the thread splits 92 remain in their open position during the compression stroke, as shown in FIG. 22, they will engage the free end of the sleeve 192 instead of being received within the sleeve 192. As shown in FIG. 23, continued movement of the first and second actuators 16, 20 toward each other will displace the sleeve 192 against the bias of the springs 198 desirably without breaking or damaging the thread splits 92 or sleeve 192. The stroke of the thread splits 92 relative to the sleeve 192 is preferably such that in this situation the mold core 18 does not "bottom out" or engage the bottom of the cavity 178 of the female mold section 22 to reduce the chance that the mold core 18 or female mold section 22 will be damaged. Desirably, even if the mold core 18 does engage the female mold section 22, the female mold section 22 can be moved against the fluid cylinder 216, as noted above, to reduce the chances that the tooling will be damaged.

While certain preferred embodiments and constructions and arrangements of particular components of the compression molding apparatus and method have been shown and described herein, one of ordinary skill in this art will readily understand that modifications and substitutions can be made without departing from the spirit and scope of the invention as defined by the appended claims. For example, without limitation, while in the presently preferred embodiments the rails of the linear bearings are disclosed as being carried by the turret 12 and the blocks are carried by the actuators, the blocks could be carried by the turret 12 and the rails carried by the actuators. Further, relative adjectives like "upper," "lower," "central," are used to describe features of the apparatus and method with respect to the position and orientation of such features as shown in the accompanying drawings of the presently preferred embodiments.

The invention claimed is:

1. An apparatus for compression molding a plastic article, comprising:
a base;
a first actuator carried by the base and including a core,
a second actuator carried by the base and including a female mold section defining a portion of a mold cavity in which the plastic article is formed, said core being at least partially received in said female mold section,
at least one linear bearing associated with at least one of the first actuator and second actuator to guide said at least one of the first actuator and second actuator for linear reciprocation relative to the base, each linear bearing including a rail carried by one of the base and said at least one of the first actuator and second actuator and a block slidably received on the rail and carried by the other of the base and said at least one of the first actuator and second actuator that does not carry said rail, and
a plurality of balls carried by the block, wherein the rail includes a track in which the balls are partially received.

2. The apparatus of claim 1 wherein the balls are carried by the block so that at least some of the balls are always in contact with the rail.

3. The apparatus of claim 1 wherein the rail includes two opposed sides each having a track, and said balls are carried by the block so that a plurality of balls engage each of said two opposed sides of the track.

4. The apparatus of claim 3 wherein the balls are carried by the block so that each of said two opposed sides of the rail are always in contact with a plurality of balls.

5. The apparatus of claim 1 wherein both the first actuator and second actuator move relative to the base, and at least one linear bearing is disposed between the base and each of the first actuator and second actuator.

6. The apparatus of claim 5 wherein at least one linear bearing is disposed between the base and the first actuator, and at least one linear bearing is disposed between the base and the second actuator.

7. The apparatus of claim 1 wherein two rails are attached to the base in the area of the first actuator, and at least two blocks are carried by the first actuator for linear reciprocation along the rails with at least one block associated with each rail.

8. The apparatus of claim 7 wherein two blocks are carried by the first actuator for linear reciprocation along one of the rails and one block is carried by the first actuator for linear reciprocation along the other rail.

9. The apparatus of 8 wherein the base includes a turret driven for rotation about an axis and said first and second actuators are carried by the turret for rotation therewith with said rails being mounted on the turret so that the rails are circumferentially spaced apart and extend generally parallel to the axis of rotation of the turret with one rail leading the other with respect to the direction of rotation of the turret, said two blocks being associated with the leading rail, and said one block being associated with the other rail.

10. The apparatus of claim 9 wherein the leading rail is axially longer than the other rail.

11. The apparatus of claim 1 wherein two rails are attached to the base in the area of the second actuator, and at least two blocks are carried by the second actuator for linear reciprocation along the rails with at least one block associated with each rail.

12. The apparatus of claim 11 wherein two blocks are carried by the second actuator for linear reciprocation along one of the rails and one block is carried by the second actuator for linear reciprocation along the other rail.

13. The apparatus of 12 wherein the base includes a turret driven for rotation about an axis and said first and second actuators are carried by the turret for rotation therewith with said rails being mounted on the turret so that the rails are circumferentially spaced apart and extend generally parallel to the axis of rotation of the turret with one rail leading the other with respect to the direction of rotation of the turret, said two blocks being associated with the leading rail and said other block being associated with the other rail.

14. The apparatus of claim 13 wherein the leading rail is axially longer than the other rail.

* * * * *